US006172765B1

(12) United States Patent
Kawamoto

(10) Patent No.: US 6,172,765 B1
(45) **Date of Patent: *Jan. 9, 2001**

(54) PRINTING SYSTEM

(75) Inventor: Hirokazu Kawamoto, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/866,085

(22) Filed: May 30, 1997

(30) Foreign Application Priority Data

Jun. 12, 1996 (JP) ........................ 8-171601

(51) Int. Cl.$^{7}$ ........................ G06K 15/00

(52) U.S. Cl. ........................ 358/1.2; 358/1.9

(58) Field of Search ........................ 395/101, 102, 395/109, 114, 115, 116, 117; 358/298, 404, 444, 518, 530; 345/428, 431

(56) References Cited

U.S. PATENT DOCUMENTS 5,382,968 * 1/1995 Endoh ........................ 347/112
5,471,563 * 11/1995 Dennis et al. ........................ 395/114
5,500,928 * 3/1996 Cook et al. ........................ 345/433
5,604,846 * 2/1997 Kadota ........................ 385/115
5,748,862 * 5/1998 Ohno et al. ........................ 395/115
5,764,867 * 6/1998 Sato ........................ 395/115
5,805,781 * 9/1998 McIntyre et al. ........................ 395/117
5,835,122 * 11/1998 Oki et al. ........................ 347/251

* cited by examiner

*Primary Examiner*—Arthur G. Evans
(74) *Attorney, Agent, or Firm*—Fitzpatrick, Cella, Harper & Scinto

(57) ABSTRACT

An information processing apparatus analyzes the objects contained in print data and creates index information consisting of the types of objects included in one job and on each page of the job, the numbers of the objects and the sizes thereof. The index information is sent to a printer together with print data. On the basis of the index information, the printer calculates the size of the image developed and the quantity of data before it performs printing. If the calculated image size and quantity of data conform to conditions decided from the memory size and printing speed of the printer, the print data is developed into an image the resolution and number of tones of which are less than those originally specified. This image is printed out.

86 Claims, 21 Drawing Sheets

FIG. 5

5a

1ST PAGE INDEX

| OBJECT CATEGORY | ON-PAGE APPEARANCE NUMBER | COLOR | SIZE |
|---|---|---|---|
| CHARACTER | 3 | MONOCHROME | 96 |
| IMAGE | 1 | COLOR | 409600 |

5b

2ND PAGE INDEX

| OBJECT CATEGORY | ON-PAGE APPEARANCE NUMBER | COLOR | SIZE |
|---|---|---|---|
| CHARACTER | 1 | MONOCHROME | 30 |
| RECTANGLE | 3 | COLOR | 232 |

5c

3RD PAGE INDEX

| OBJECT CATEGORY | ON-PAGE APPEARANCE NUMBER | COLOR | SIZE |
|---|---|---|---|
| CHARACTER | 5 | MONOCHROME | 298 |
| RECTANGLE | 1 | MONOCHROME | 16 |

5d

4TH PAGE INDEX

| OBJECT CATEGORY | ON-PAGE APPEARANCE NUMBER | COLOR | SIZE |
|---|---|---|---|
| CHARACTER | 3 | MONOCHROME | 96 |

5e

5TH PAGE INDEX

| OBJECT CATEGORY | ON-PAGE APPEARANCE NUMBER | COLOR | SIZE |
|---|---|---|---|
| CHARACTER | 6 | MONOCHROME | 1037 |

5f

JOB INDEX

| OBJECT CATEGORY | ON-PAGE APPEARANCE NUMBER | COLOR | SIZE |
|---|---|---|---|
| CHARACTER | 18 | MONOCHROME | 1557 |
| IMAGE | 1 | COLOR | 409600 |
| RECTANGLE | 1 | MONOCHROME | 15 |
| RECTANGLE | 3 | COLOR | 232 |

FIG. 6

◊ CHARACTER DATA STREAM

| | |
|---|---|
| JOB INDEX | < ESC > [1:18:1557;4:1:409600;5:1:16;6:1:232&i |
| 1ST PAGE INDEX | < ESC > [1:3:96;4:1:409600&i |
| 2ND PAGE INDEX | < ESC > [1:1:30;6:1:232&i |
| 3RD PAGE INDEX | < ESC > [1:5:298;5:1:16&i |
| 4TH PAGE INDEX | < ESC > [1:3:96&i |
| 5TH PAGE INDEX | < ESC > [1:6:1037&i |

FIG. 16A

| | |
|---|---|
| PROGRAM FOR GENERATING PRINT DATA | 1502a |
| PROGRAM FOR RETRIEVING PRINT DATA | 1505a |
| PROGRAM FOR GENERATING INDICES | 1506a |
| PROGRAM FOR ACQUIRING RESOLUTION DETERMINATION CONDITIONS | 1515a |
| PROGRAM FOR DETERMINING RESOLUTION | 1513a |
| PROGRAM FOR GENERATING AND INSERTING RESOLUTION LOWERING COMMAND | 1514a |
| PROGRAM FOR ACQUIRING TONALITY DETERMINATION CONDITIONS | 1519a |
| PROGRAM FOR DETERMINING TONALITY | 1517a |
| PROGRAM FOR GENERATING AND INSERTING TONALITY REDUCING COMMAND | 1518a |
| PROGRAM FOR RETAINING PRINT DATA | 1503a |
| PROGRAM FOR TRANSFERRING PRINT DATA | 1504a |

FIG. 16B

| | |
|---|---|
| PROGRAM FOR INTERPRETING RESOLUTION LOWERING COMMAND | 1511a |
| PROGRAM FOR TRANSMITTING RESOLUTION DETERMINATION CONDITIONS | 1516a |
| PROGRAM FOR INTERPRETING TONALITY REDUCING COMMAND | 1520a |
| PROGRAM FOR TRANSMITTING TONALITY DETERMINATION CONDITIONS | 1521a |

PRINTING SYSTEM

BACKGROUND OF THE INVENTION

1. Field of the Invention

This invention relates to a printing system constituted by a printing apparatus for printing out print data and an information processing apparatus connected to the printing apparatus for transferring print data to the printing apparatus, a printing control apparatus and method used to control this printing system, a printer driver and a storage medium for storing the printer driver.

2. Description of the Related Art

In a printing system constituted by a printer and a host such as a personal computer, the personal computer generally creates print data and transfers the print data to the printer. Whenever the printer receives the print data from the personal computer, the printer develops the print data into image data at the set resolution and number of tonality levels and then prints out the image data.

The printer used in this printing system has a function for automatically executing resolution/tonality modification processing, which is processing for changing the resolution and/or number of tones, set for the print data, to a lower resolution or smaller number of tones (grays) in dependence upon control conditions that include the storage capacity that can be utilized to develop the print data into the image data and the utilizable printout speed. More specifically, if the set resolution is high and the number of tones is large, the storage capacity required is large and developing the image data takes time. Accordingly, on the basis of control conditions inclusive of the storage capacity usable for image development processing and the printing speed of the printer, the printer determines, whenever it receives print data, whether the image data can be developed at the resolution and number of tones that have been set for the print data. If the image data cannot be developed, the printer judges that it is necessary to execute resolution/tonality modification processing to change the resolution and number of tones to a lower resolution and number of tones. In such case the printer invalidates the processing that was executed up to the moment the aforementioned determined was made and re-generates image data that conforms to the resolution and tonality obtained by reducing the resolution and number of tones of the print data received thus far. By implementing the resolution/tonality modification processing function when image data cannot be developed under the above-described control conditions, it is unnecessary to suspend printout for the purpose of resetting resolution and tonality.

When the resolution/tonality modification processing for changing the resolution and number of tones to a lower resolution and smaller number of tones is executed in the conventional printing system, image data conforming to the resolution and tonality obtained by reducing the resolution and number of tones of the print data received thus far is generated again, as set forth above. As a consequence, printing out the image data takes a longer period of time. The time needed for printout is greatly prolonged especially when printing out a plurality of pages.

SUMMARY OF THE INVENTION

Accordingly, an object of the present invention is to provide a printing system, a printing control apparatus, a printing control method, a printer driver and a medium for storing the same, wherein resolution/tonality modification processing for changing resolution and number of tones to a lower resolution and number of tones can be executed without prolonging the time needed for printing.

According to the present invention, the foregoing object is attained by providing a printing system having a host and a printing apparatus in which at least one of resolution and number of tones is capable of being changed over, the system comprising index creating means for creating index information of an object included in print data, decision means for deciding, based upon quantity of data and image size obtained from the index information, whether it is necessary to lower resolution or number of tones when the print data is printed by the printing apparatus, and control means for causing the print data to be printed at a resolution lower than an original resolution or with a number of tones smaller than an original number of tones if the decision means has decided that it is necessary to lower resolution or number of tones.

According to the present invention, the foregoing object is attained by providing a printing control apparatus for controlling a printing apparatus in which at least one of resolution and number of tones is capable of being changed over, the control apparatus comprising index creating means for creating index information of an object included in print data, decision means for deciding, based upon quantity of data and image size obtained from the index information, whether it is necessary to lower resolution or number of tones when the print data is printed by the printing apparatus, and control means for causing the print data to be printed at a resolution lower than an original resolution or with a number of tones smaller than an original number of tones if the decision means has decided that it is necessary to lower resolution or number of tones.

According to the present invention, the foregoing object is attained by providing a printing control method for controlling a printing apparatus in which at least one of resolution and number of tones is capable of being changed over, the method comprising an index creating step of creating index information of an object included in print data, a decision step of deciding, based upon quantity of data and image size obtained from the index information, whether it is necessary to lower resolution or number of tones when the print data is printed by the printing apparatus, and a control step of causing the print data to be printed at a resolution lower than an original resolution or with a number of tones smaller than an original number of tones if it is decided at the decision step that it is necessary to lower resolution or number of tones.

According to the present invention, the foregoing object is attained by providing a storage medium storing a program for controlling a printing apparatus in which at least one of resolution and number of tones is capable of being changed over, the program comprising index creating means for creating index information of an object included in print data, decision means for deciding, based upon quantity of data and image size obtained from the index information, whether it is necessary to lower resolution or number of tones when the print data is printed by the printing apparatus, and control means for causing the print data to be printed at a resolution lower than an original resolution or with a number of tones smaller than an original number of tones if the decision means decides that it is necessary to lower resolution or number of tones.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 illustrates information for generating indices that are generated in print-data retrieval means of FIG. 3

FIG. 6 illustrates a print data stream generated by index generating means in FIG. 3;

FIGS. 16A and 16B illustrate programs for constructing the printing control apparatus (printer driver) in the printing system of FIG. 15;

DESCRIPTION OF THE PREFERRED EMBODIMENTS

Embodiments of the present invention will now be described with reference to the drawings.

(First Embodiment)

Figure 1:
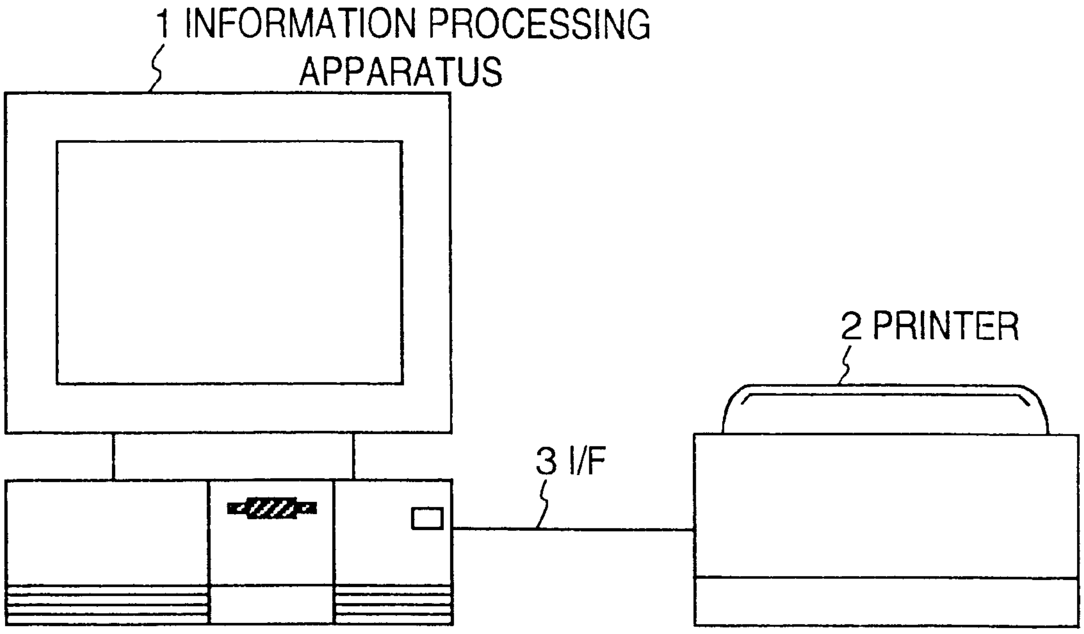
FIG. 1 is a conceptual view showing the configuration of a printing system according to a first embodiment of the present invention.
Figure 2:
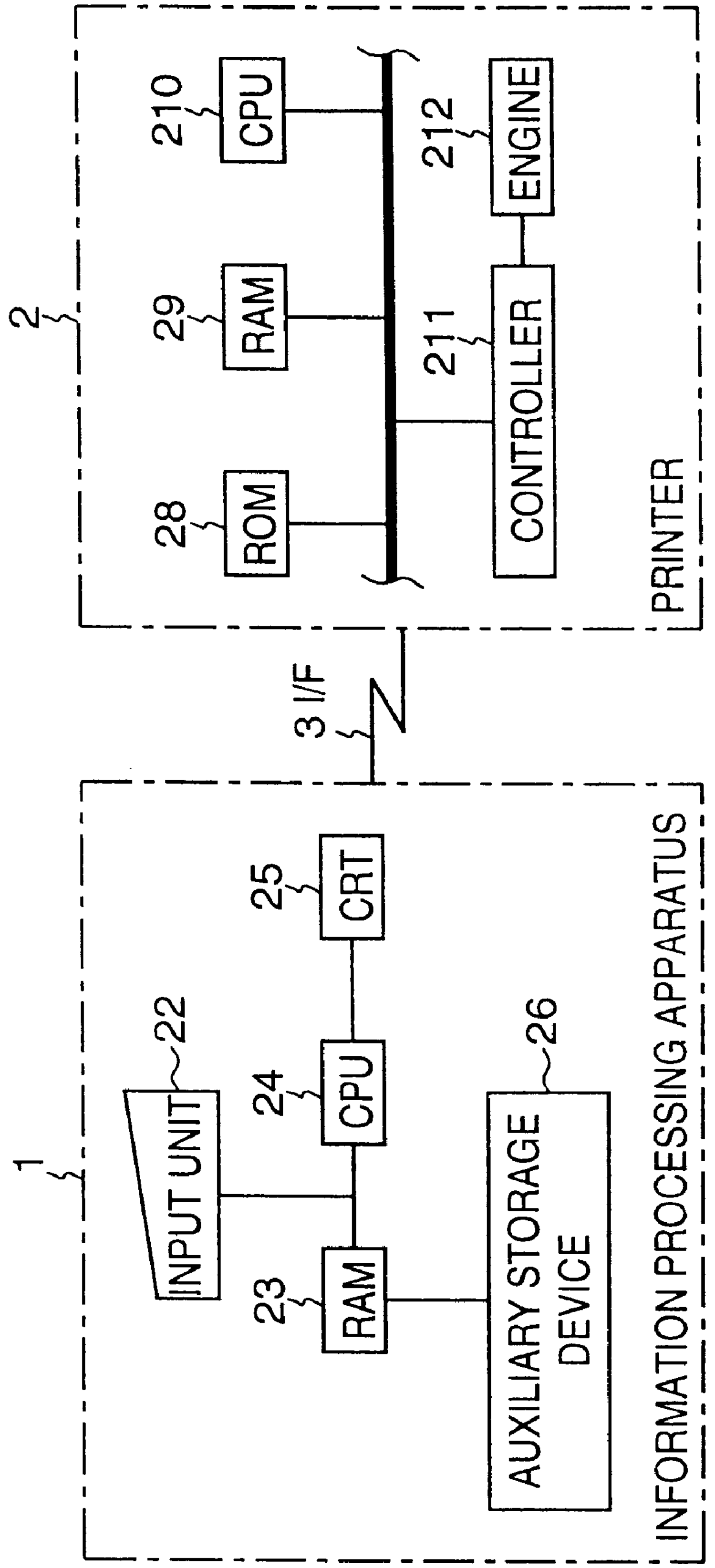
FIG. 2 is a block diagram showing the hardware configuration of an information processing apparatus and printer constructing the printing system of FIG. 1.
Figure 3:
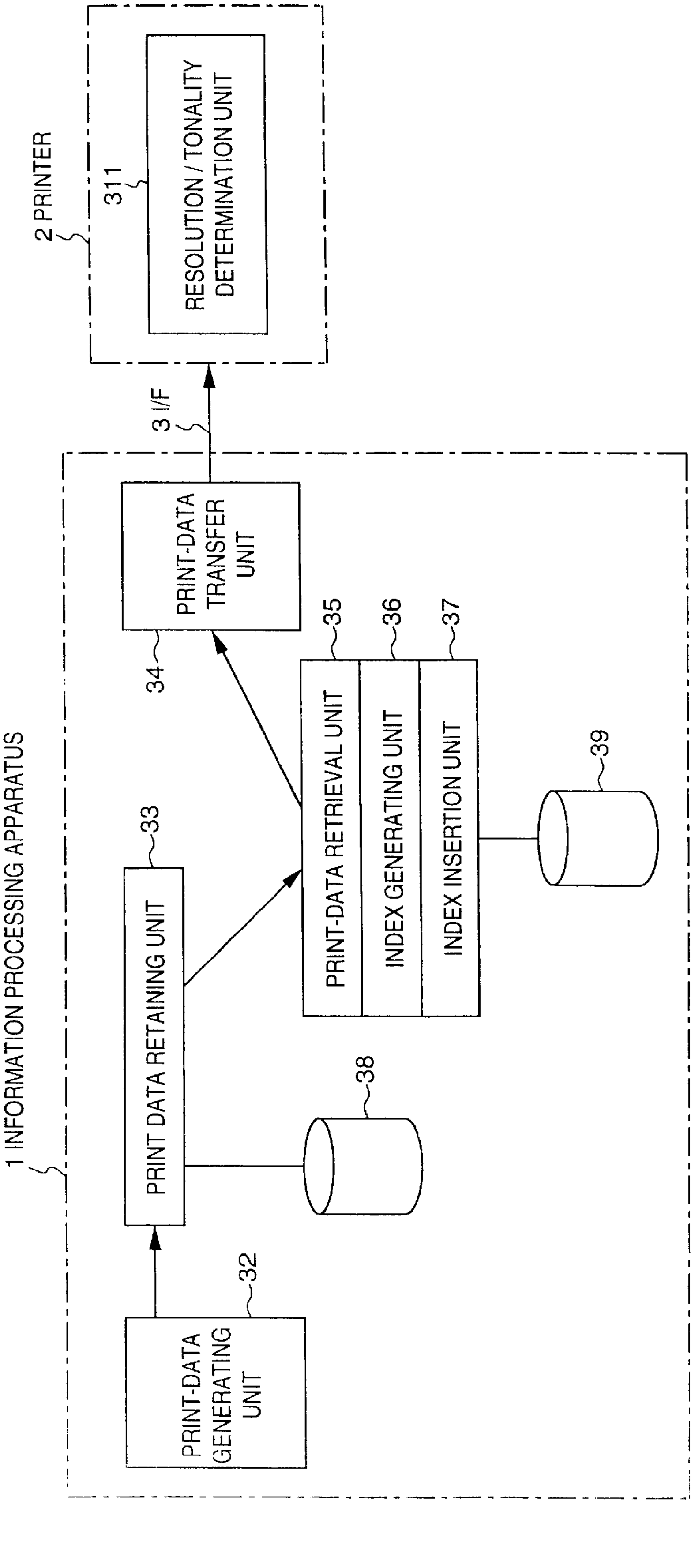
FIG. 3 is a block diagram showing the architecture of a printing control apparatus (printer driver) included in the printing system of FIG. 1.
Figure 4:
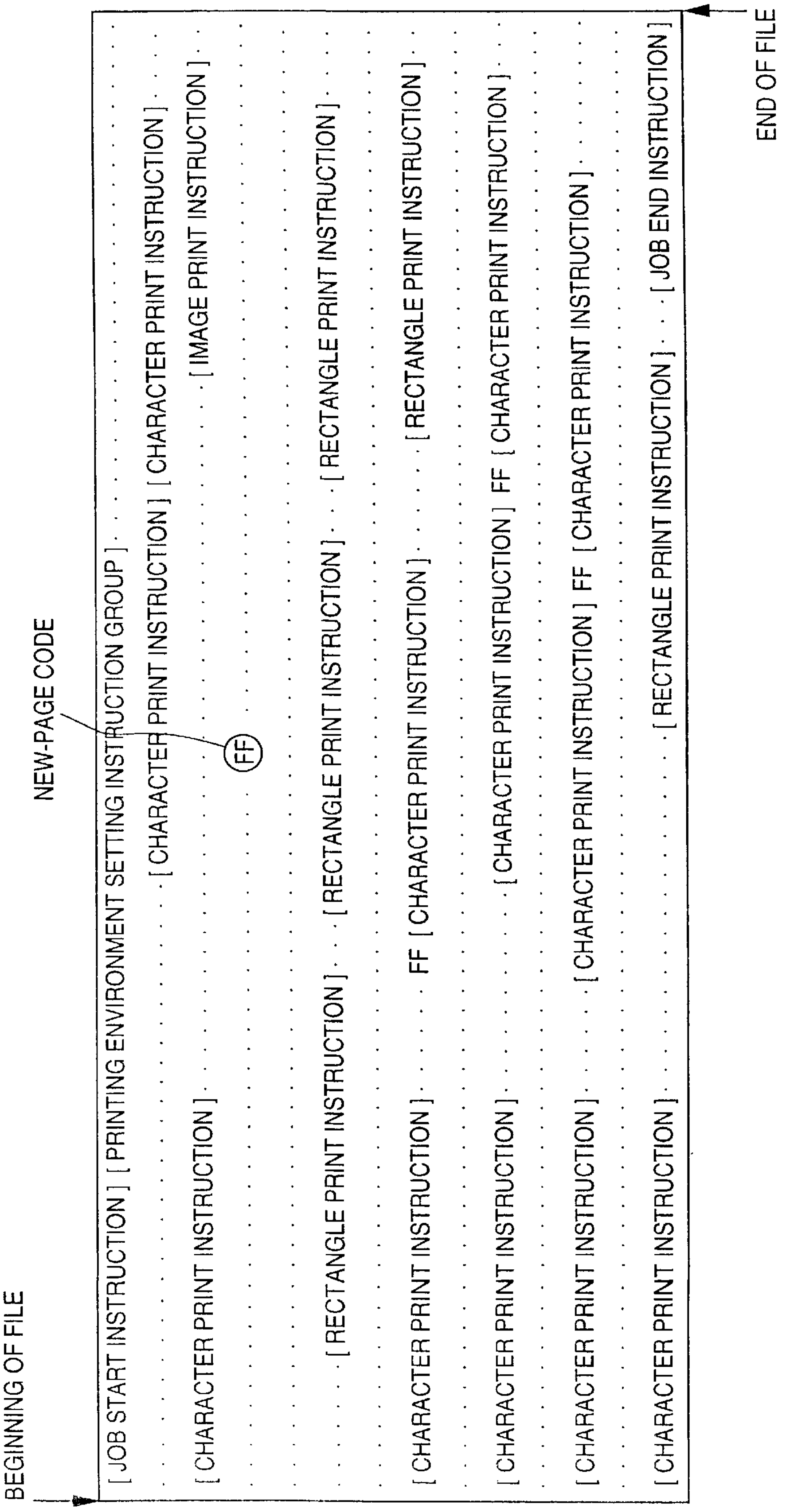
FIG. 4 is a diagram showing the content of print-data retention file in FIG. 3.
Figure 7:
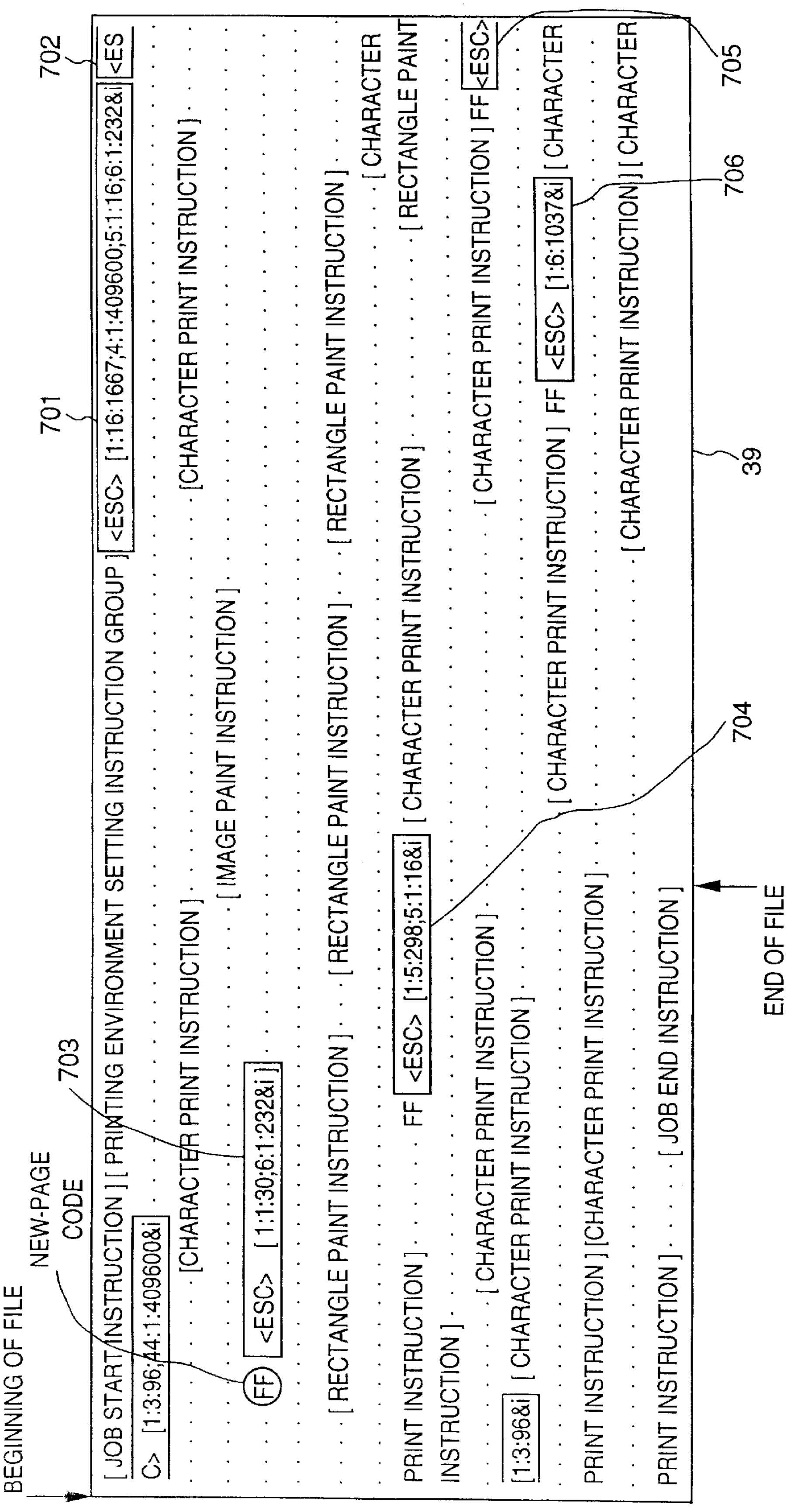
FIG. 7 is a diagram illustrating the content of a print-data retention file after the insertion of indices.
Figure 10A:
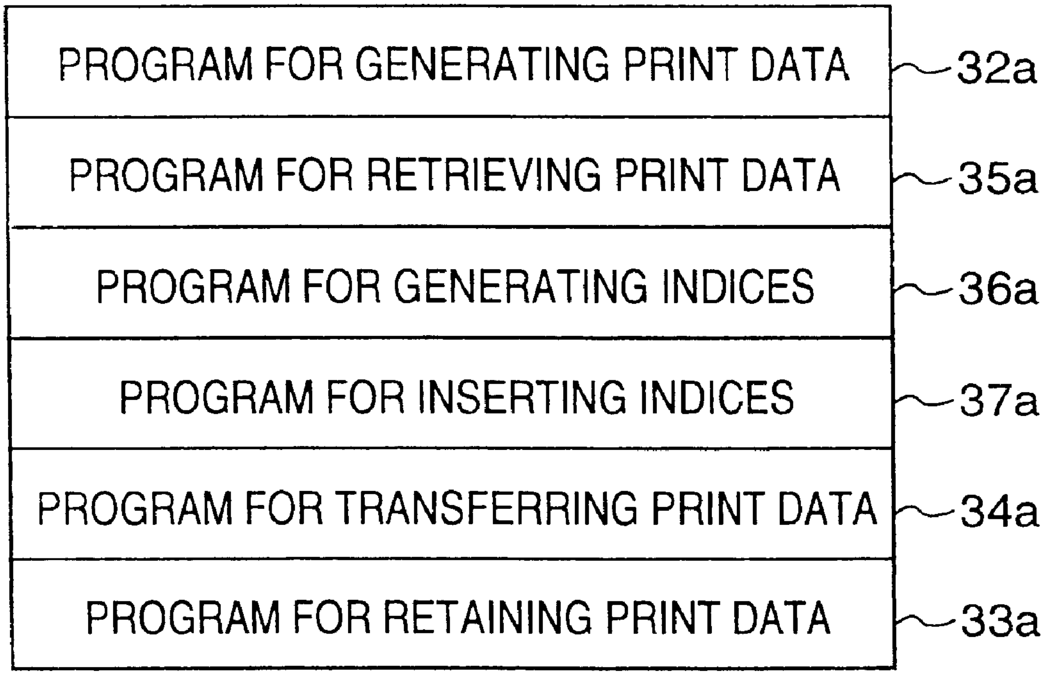
FIGS. 10A and 10B illustrate programs for constructing the printing control apparatus (printer driver) in the printing system of FIG. 1.
Figure 10B:

FIG. 1 is a conceptual view showing the configuration of a printing system according to a first embodiment of the present invention, FIG. 2 is a block diagram showing the hardware configuration of an information processing apparatus and printer constructing the printing system of FIG. 1, FIG. 3 is a block diagram showing the architecture of a printing control apparatus (printer driver) included in the printing system of FIG. 1, FIG. 4 is a diagram showing the content of print-data retention file in FIG. 3, FIG. 5 illustrates information for generating indices that are generated in a print-data retrieval unit of FIG. 3, FIG. 6 illustrates a print data stream generated by an index generating unit in FIG. 3, and FIG. 7 is a diagram illustrating the content of a print-data retention file after the insertion of indices, and FIGS. 10A and 10B illustrate programs for constructing the printing control apparatus (printer driver) in the printing system of FIG. 1.

As shown in FIG. 1, the printing system includes an information processing apparatus 1, such as a personal computer having a document processing function for creating a document and converting the document to print data, and a printer 2 connected to the information processing apparatus 1 via a Centronics interface (hereinafter referred to as an "I/F") 3. The printer 2 comprises a color laser printer or the like for printing out the print data transferred from the information processing apparatus 1 via the I/F 3.

<Construction and operation of information processing apparatus>

The information processing apparatus 1 has a CPU 24, as illustrated in FIG. 2. The CPU 24 controls the overall system in accordance with a system program (operating system) that has been stored in a RAM 23, and executes application program stored in the RAM 23 or in an auxiliary storage device 26.

The RAM 23 stores the above-mentioned application programs and is used as a working member for processing executed by the CPU 24. The auxiliary storage device 26 is used as a special-purpose memory for storing application programs, data files obtained by executing the application programs, etc. An example of the auxiliary storage device 26 is a read/write storage medium such as a hard disk (HD), a floppy disk (FD) or a magneto-optical (MO) disk. Examples of application programs stored in the auxiliary storage device 26 are a printer driver program which provides a printer driver (shown in FIG. 3) for controlling the printer 2, a document processing program which provides a document processing function, etc.

Selection and specification of processing to be executed by the CPU 24 is carried out making inputs using an input unit 22 having a keyboard, a mouse and the like.

Results of processing executed by the CPU 24 on the basis of an application program are displayed on a display (referred to as a "CRT" below) 25 and printed out by the printer 2.

As shown in FIG. 2, the printer 2 has a CPU 210 for controlling the overall apparatus based upon a system program that has been stored in a ROM 28, a RAM 29 used as a working memory for processing executed by the CPU 210, an engine 212 for printing out print data transferred from the information processing apparatus 1 via the I/F 3, and a controller 211 for driving and controlling the engine 212.

As shown in FIG. 3, a printer driver in the information processing apparatus 1 has a print-data generating unit 32 for converting document data, which has been created by the document processing function, to print data capable of being interpreted by the printer 2. This conversion is performed in dependence upon content of output processing of set fonts or the like. The print data is stored temporarily in the RAM 23 in a binary format as a retention file (referred to as a "file" below) 38 by a print-data retaining unit 33. As shown in FIG. 4, the file 38 stored in the RAM 23 starts with a "job start instruction", includes instructions such as a "printing environment setting instruction" and a "character print instruction", and ends with a "job end instruction".

The file 38 that has been stored in the RAM 23 is read out by the print-data retaining unit 33 and applied to a print-data retrieval unit 35. The latter searches the content of the file 38 and extracts data for generating indices that indicate the characteristics of the file 38. The extracted data contains the number of times various objects such as characters and images on each page of the print data appear on one page, the color of each object, the data size of each object, etc.

The data extracted per each page by the print-data retrieval unit 35 is applied to an index generating unit 36 after being stored in the RAM 26. The index generating unit 36 generates indices representing the characteristics of the file 38 using the data extracted per each page by the print-data retrieval unit 35.

The indices generated include page indices 5*a*~5*e* generated per each page shown in FIG. 5, and a job index 5*f* for the file 38. Each page index comprises a number of items of data, namely an object category item which classifies the data on each page of the print data as a character, image or rectangle, an on-page appearance count which indicates the number of times each object appears on one page, a color item which indicates the color of each object, and a size item which indicates the data size of each object. By way of example, in the page index 5*a* of the first page of print data, the character appearance count is "3", the color thereof is "monochrome", the size thereof is "96", the image appearance count is "1", the color thereof is "color" and the size thereof is "409600". The job index 5*f*, on the other hand, indicates the number of times each object appears, the color of each object and the data size of each object with regard to the entirety of the print data.

The job index and the page index of each page that have been created are stored in the RAM 23. For example, as shown in FIG. 6, the job index is stored in the RAM 23 in a data format

<ESC> [11:18:1557;4:1:409600;5:1:16;6:1:233&I and the page index of the first page which follows the job index is stored in the RAM 23 in the data format

<ESC> [1:3:96;4:1:409600&I

In this data format, the three items of data marked off by every semicolon (";") indicate the category and color of a single object, the appearance count of the object and its size, respectively. For example, in "1:18:1557", "1" at the beginning of this set indicates an object which is a monochrome character, "18" indicates that the appearance count is 18 and "1557" indicates that the data size is 1557.

The job index and the page index of each page that have been stored in the RAM 23 are applied to an index insertion unit 37, which inserts the job index and the page index of each page in the file 38. More specifically, as shown in FIG. 7, the job index, which is indicated at 701, is inserted in front of the first page of data near the beginning of the file. The page index, indicated at 702, of the first page is inserted after the job index 701. Page indices 703~706 of the ensuing pages are inserted immediately after new-page instructions (FF), which indicate the end of the data on the previous page. The file illustrated in FIG. 7 is obtained by thus inserting the job index 701 and page indices 702~706 of the respective pages into the file 38. The file shown in FIG. 7 is stored in the RAM 23 in a binary format as a print-data retention file (referred to as a "file" below) 39 after the insertion of the indices.

The file 39 that has been stored in the RAM 23 is read out by a print-data transfer unit 34, as shown in FIG. 3. The print-data transfer unit 34 transfers the file 39 as print data to the printer 2 via the I/F 3.

The print-data generating unit 32, print-data saving unit 33, print-data retrieval unit 35, index generating unit 36, index insertion unit 37 and print-data transfer unit 34 are implemented by programs that have been stored in the auxiliary storage device 26. More specifically, as shown in FIG. 10A, the print-data generating unit 32, print-data saving unit 33, print-data retrieval unit 35, index generating unit 36, index insertion unit 37 and print-data transfer unit 34 are implemented by a program 32*a* for generating print data, a program 33*a* for temporarily retaining print data, a program 35*a* for retrieving print data, a program 36*a* for generating indices, a program 37*a* for inserting indices, and program 34*a* for transferring print data, respectively.

<Printer operation>

Upon receiving print data, the printer 2 extracts, from the print data received, the job index and page indices that indicate the characteristics of this print data, and decides, based upon control conditions and the job index and page indices that have been extracted, whether or not resolution/tonality modification processing is necessary. More specifically, the control conditions include the storage capacity that can be utilized in processing for developing the print data into image data, as well as printout speed. Resolution lowering conditions and conditions for reducing the number of tonality levels are decided from these control conditions. A resolution/tonality determination unit 311 determines whether a job index or page index satisfies resolution lowering conditions or conditions for reducing the number of tones. When a job index or page index satisfies resolution lowering conditions or conditions for reducing the number of tones, the determination unit 311 determines that it is necessary to execute resolution/tonality modification processing with regard to this printing job.

Conditions for altering resolution differ from those for altering tonality. When a job index or page index matches the control conditions, the significance with regard to resolution and the significance with regard to tonality differ. First, in relation to resolution, the fact that a job index or page index is in accordance with the control conditions means that the following conditions (1)~(4) are satisfied:

(1) the data size per page is greater than four megabytes;

(2) the data size per job is greater than 16 megabytes;

(3) the color image size is greater than 100×100 dots; and (4) the monochrome image size is greater than size A4.

The condition (2) is tested based upon the job index and the other conditions are tested based upon the page index.

In addition, if enlargement of the image has been specified, the above-mentioned conditions are determined by multiplying the data size or image size by the enlargement ratio. If these conditions are satisfied, the printer resolution is lowered by one stage and the output image is formed to have the commensurate size. For example, if any of the conditions (1)~(4) is satisfied in a case where the printer is capable of printing at 300 dpi and 600 dpi and the designated resolution is 600 dpi, then the resolution is lowered to 300 dpi and the image to be developed is developed at a pixel density that is commensurate with this resolution.

Since size for each category of object has been registered in the page index and job index, the data size is obtained by summing the sizes. Image size is obtained with regard to an object judged to be a color or monochrome image from the data category. Approximate image size is obtained from the number of pixels found by dividing the data size of an image by the number of bits per pixel.

Next, in regard to tonality, the fact that a job index or page index is in accordance with the control conditions means that the following conditions (5)~(7) are satisfied:

(5) the data size per page is greater than 16 megabytes;

(6) the data size per job is greater than 20 megabytes; and (7) the color image size of 24 bits/pixel is greater than 2000×2500 dots.

The condition (6) is tested based upon the job index and the other conditions are tested based upon the page index.

If these conditions are satisfied, the number of tones of the image to be developed is reduced by one stage and the output image is formed to have the commensurate size. The extent to which the number of tones is reduced may be any desired extent. To simplify the description, however, here tonality is reduced in increments of nine bits, by way of example. If the original number of tones of each other in the image is 256, i.e. if the image originally is an image of (3 colors)×(8 bits)=24 bits/pixel, then the three lower order bits for each color are eliminated to change the number of tones to 32, i.e. to effect a change to an image of (3 colors)×(5 bits)=15 bits/pixel. As a result, nine bits of data are reduced per pixel. If the image is developed using the reduced number of tones, the image will be subjected to processing such as pseudo-grayscaling in conformity with the number of steps of tonality of the printer 2 and the processed image will be printed out.

It should be noted that the data sizes and image sizes in conditions (1)~(7) are values decided by the memory capacity and printing speed of the printer 2. These values shown in conditions (1)~(7) are those of this embodiment but can be enlarged if the memory capacity is increased or if the printing speed is raised. Conversely, the values of the data size and image side in conditions (1)~(7) must be reduced if the memory capacity is reduced or if the printing speed is lowered.

In other words, the values of the data size and image side in conditions (1)~(7) indicate boundary values at which memory overflow or printer overrun would occur in the printer used.

The determination as to whether resolution/tonality modification processing is necessary is made by the resolution/tonality determination unit 311. The latter is implemented by a resolution/tonality determination program 311*a* that has been stored in the ROM 28 shown in FIG. 10B. When the resolution/tonality determination unit 311 has determined that resolution/tonality modification processing is required for a certain printing job, image data is generated from the print data of this printing job by lowering the set resolution and the number of tones. This image data is then printed out.

Figure 8:
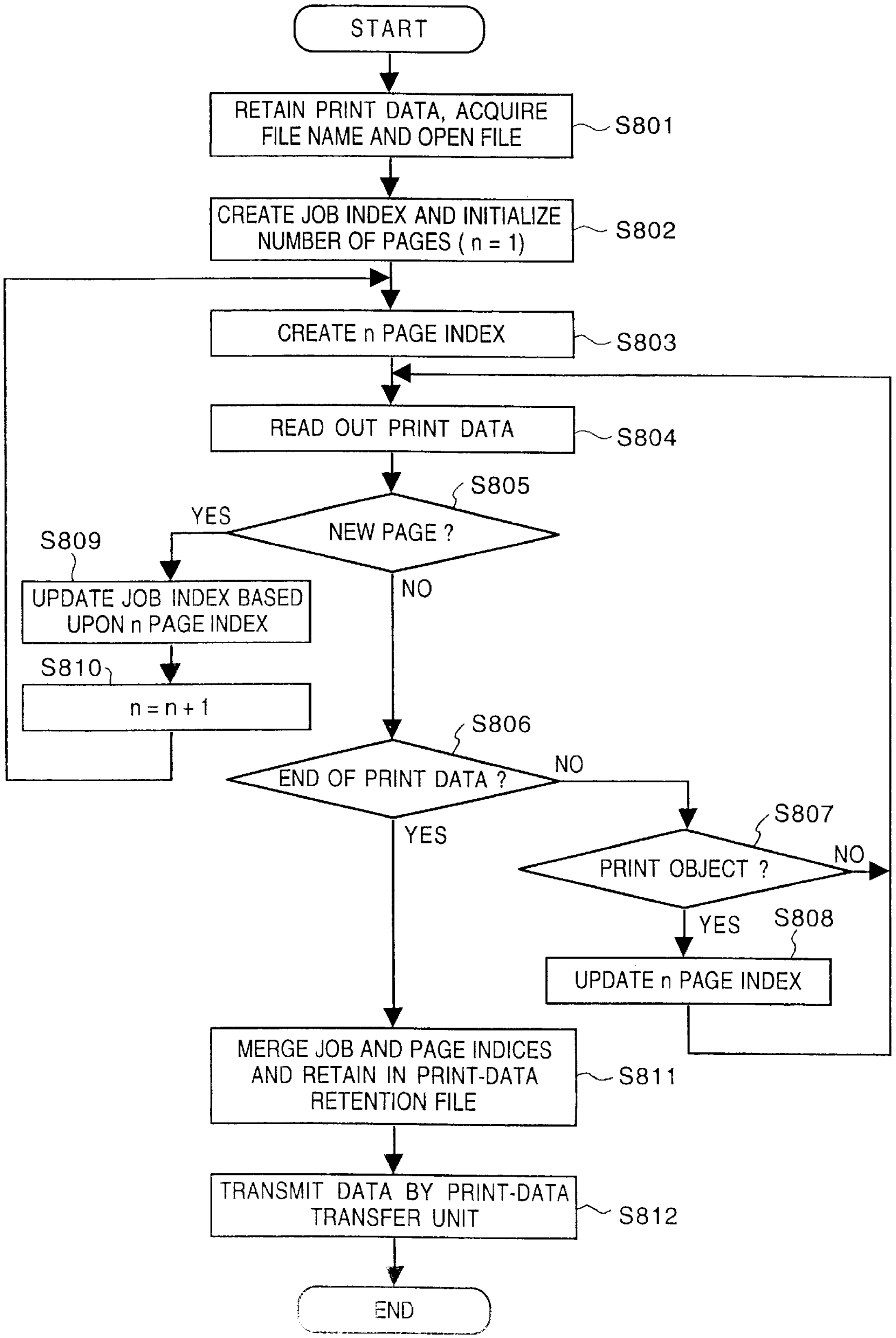
FIG. 8 is a flowchart illustrating processing from generation of each index by the information processing apparatus in the printing system of FIG. 1 to transfer of a file in which these indices have been inserted.
Figure 9:
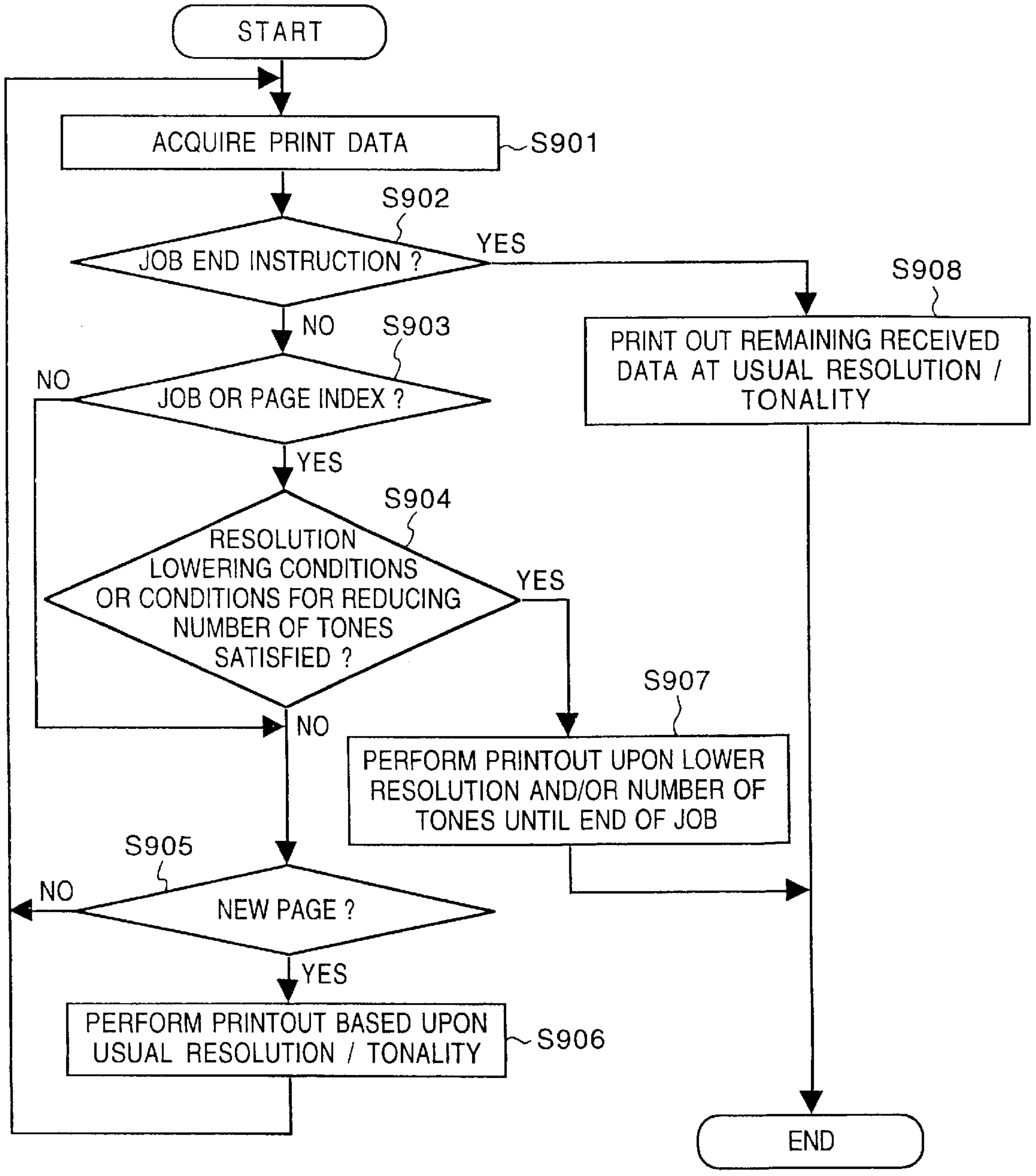
FIG. 9 is a flowchart illustrating processing for deciding whether or not it is necessary to execute resolution/tonality modification processing by the printer in the printing system of FIG. 1.

Reference will now be had to the flowcharts of FIGS. 8 and 9 to describe processing from generation of each index by the information processing apparatus 1 to the transfer of a file in which these indices have been inserted, and processing for determining whether or not it is necessary to execute resolution/tonality modification processing by the printer 2. FIG. 8 is a flowchart illustrating processing from generation of each index by the information processing apparatus in the printing system of FIG. 1 to transfer of a file in which these indices have been inserted, and FIG. 9 is a flowchart illustrating processing for deciding whether or not it is necessary to execute resolution/tonality modification processing by the printer in the printing system of FIG. 1.

First, at step S801 in FIG. 8, the name of a file to be printed (a print-data retention file) is acquired and the corresponding file 38 is opened. When the corresponding file 38 is opened, initialization for the purpose of creating a job index is performed and the page number n is initialized (step S802). Next, initialization for creating an n page index is performed (step S803). More specifically, in these initialization operations, a job index in which an initial value has been substituted and the page index of a first page in which an initial value has been substituted are stored in the RAM 23.

When initialization ends, print data are read out of the opened file 38 from the beginning thereof in instruction units. More specifically, first the "job start instruction" situated at the beginning of the file 38 shown in FIG. 4 is read out.

Next, it is determined whether the print data read out is the new-page instruction (FF) (step S805). When the print data read out is the new-page instruction, it is determined whether the print data read out is the "job end instruction" (step S806).

When the read print data is not the "job end instruction", it is determined whether the print data read out is a print object (step S807). When the print data read out is a print object, i.e. when the print data read out is a character, an image, a rectangle or the like, the page index of the nth page that has been stored in the RAM 23 is updated (step S808) and the program returns to step S804 so that the next item of print data is read out. On the other hand, when the print data read out is not a print object, i.e. when the print data read out is a control command, the program returns to step S804 without step S808 being executed and then the next item of print data is read out.

Thus, processing from step S804 to step S808 is repeatedly executed until one page of print data is read out in its entirety, thereby creating the page index of the nth page.

If it is determined that the print data read out is the new-page instruction (step S805), then the creation of the page index of the nth page is finished and the job index that has been stored in the RAM 23 is updated to the page index of the nth page just created (step S809).

Next, the number n of pages is incremented (step S810), processing proceeds to step S803 again and the creation of the page index of the next page is performed repeatedly from step S804 to step S808.

When it is determined that the print data read out is the "job end instruction" (step S806), the job index and page indices are inserted into the corresponding positions of the file 38 to generate the file (the print-data retention file after insertion of the indices) 39 shown in FIG. 7 (step S811).

Next, the file 39 is transferred as print data to the printer 2 by the print-data transfer unit 34 via the I/F 3 (step S812), after which processing is terminated.

When the printer 2 receives the print data transferred via the I/F 3, the printer acquires the print data from the received print data in instruction unit (step S901).

Next, it is determined whether the acquired print data is the "job end instruction" (step S902). If the acquired print data is not the "job end instruction", it is determined whether the acquired print data is a job index or a page index (step S903). If the acquired print data is a job index or page index, then it is determined whether the job index or page index conforms to the printing conditions for lowering resolution or reducing the number of tones (step S904). If it is judged that the job index or page index does not conform to the printing conditions for lowering resolution or reducing the number of tones, i.e. if it is judged that it is unnecessary to execute resolution/tonality modification processing, then it is determined whether the print data is the new-page instruction (FF) (step S905).

If it is found at step S903 that condition (2) mentioned above has been satisfied, then printout is performed upon lowering the resolution for the entire job. If condition (1), (3) or (4) has been satisfied, printout is performed upon lowering the resolution of pages starting from the page that corresponds to the page index tested. If condition (6) has been satisfied, printout is performed upon reducing the number of tones for the entire job. If condition (5) or (7) has been satisfied, printout is performed upon reducing the number of tones of pages starting from the page that corresponds to the page index tested. A job or page for which any of conditions (1)~(4) and any of conditions (5)~(7) are satisfied simultaneously is printed upon lowering resolution and reducing the number of tones.

When the print data is not the new-page instruction, printout is performed based upon the usual resolution/tonality (step S906). By repeating the execution of steps S901 through S905, printout based upon the usual resolution/tonality is performed until it is determined that the print data is the new-page instruction, i.e. until the output of one page is completed. Further, step S904 is skipped until it is determined that the print data is the new-page instruction.

If it is determined that a job index or page index conforms to the conditions for lowering resolution or reducing the number of tones (step S904), i.e., if it is determined that resolution/tonality modification processing is required, image data is generated upon changing the set resolution and number of tones to a lower resolution and smaller number of tones with regard to the corresponding print data and printout is performed based upon this image data (step S907). This printout of reduced resolution and number of tones continues until the current printing job is finished, i.e. until the "job end instruction" is acquired.

If the acquired print data is the "job end instruction" (step S906), the remaining part of the received data is printed out based upon the usual resolution/tonality (step S908). Processing is then terminated.

Thus, according to this embodiment, print data into which indices indicating the characteristics of the print data have been inserted are transferred to the printer 2, the printer compares these indices with control conditions and, based upon the results of the comparison, decides whether resolution/tonality modification processing is necessary. Accordingly, it is no longer necessary to re-generate image data conforming to reduced resolution and a reduced number of tones using print data received by the printer thus far. This means that it is possible to execute resolution/tonality modification processing for lowering resolution and reducing the number of tones without lowering printout speed.

(Second Embodiment)

Figure 11:
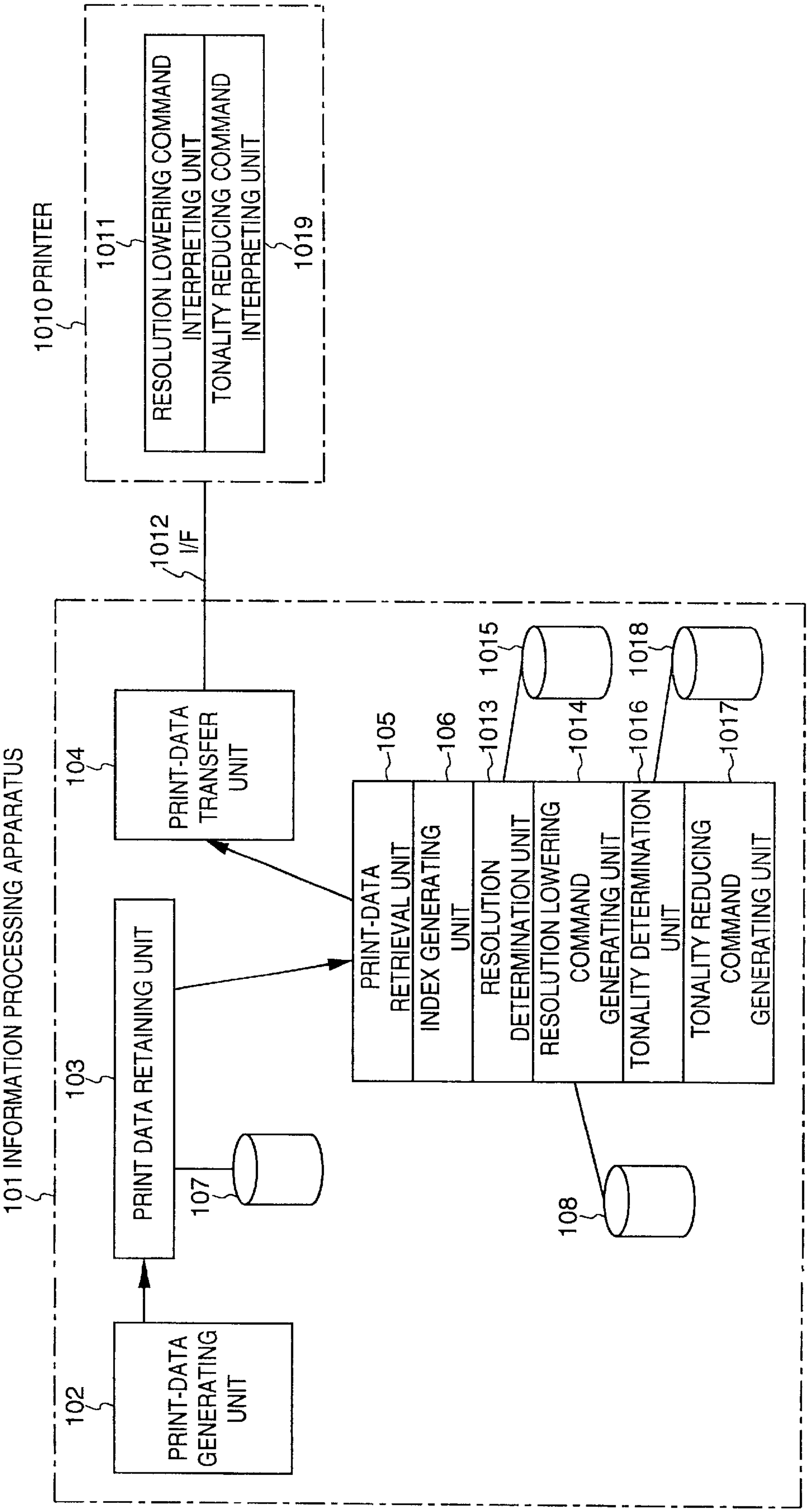
FIG. 11 is a block diagram illustrating the architecture of a printing control apparatus (printer driver) in a printing system according to a second embodiment of the present invention.
Figure 12:
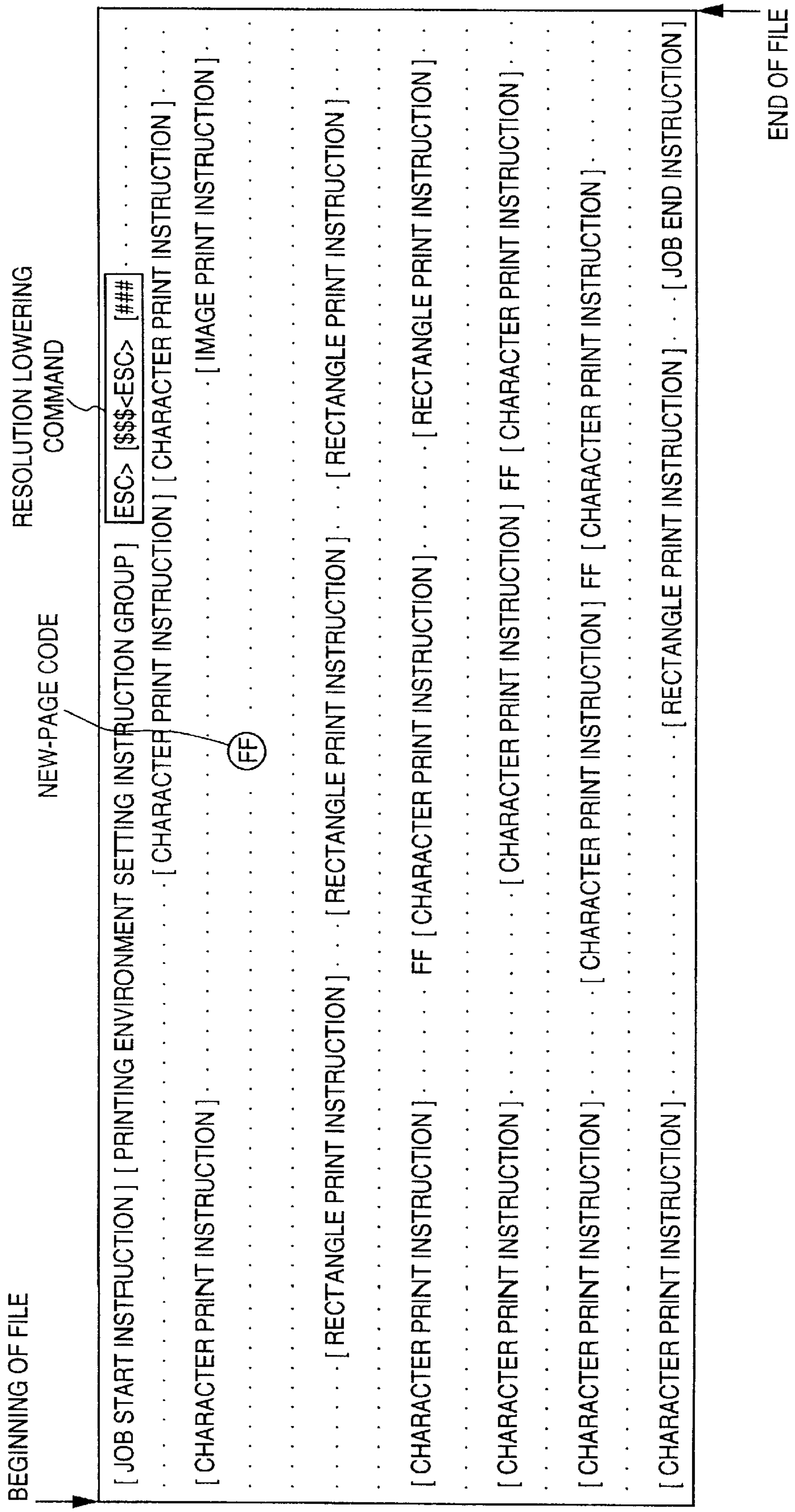
FIG. 12 is a diagram showing the content of the print-data retention file in FIG. 11 in which a resolution lowering command has been inserted.
Figure 13:
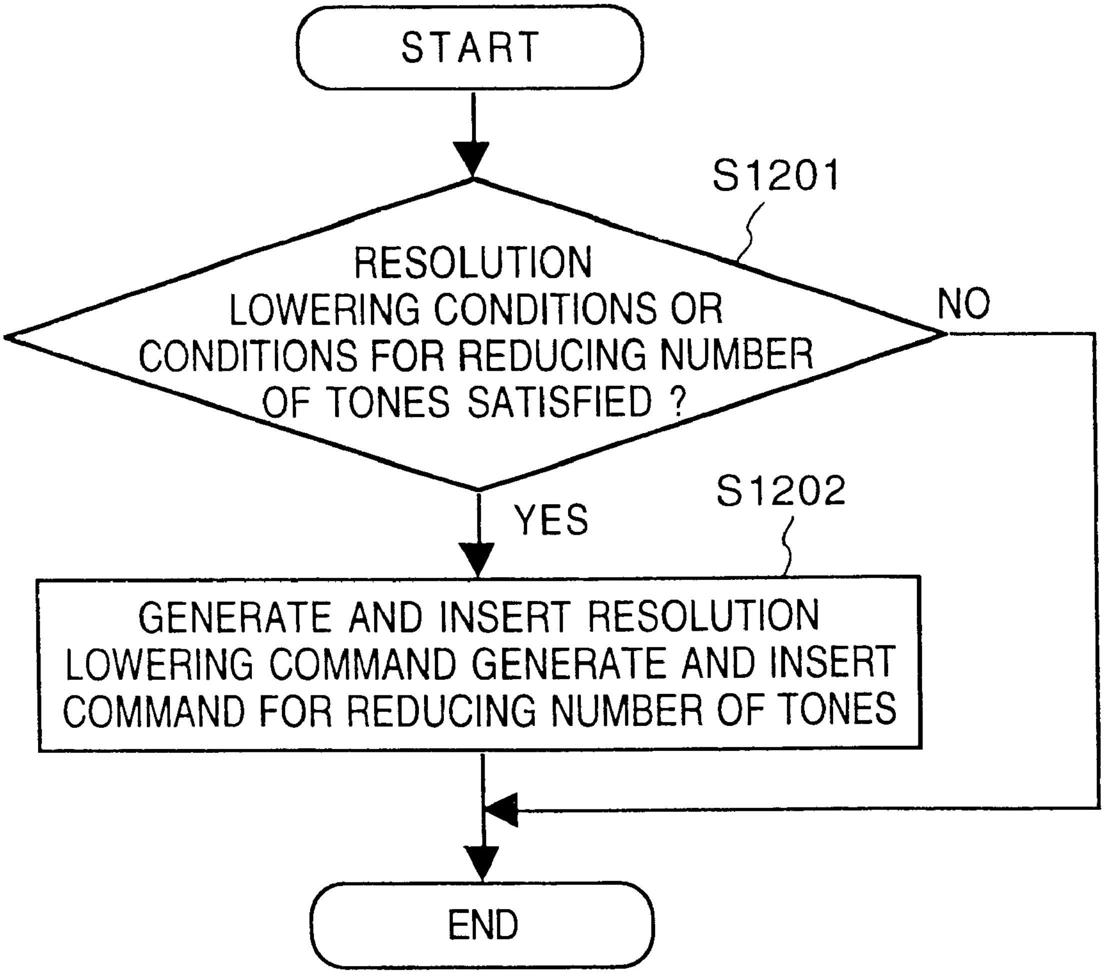
FIG. 13 is flowchart illustrating processing for inserting a resolution lowering command and a command for lowering the number of tones into a file by the image processing apparatus in the printing system of FIG. 11.
Figure 14A:
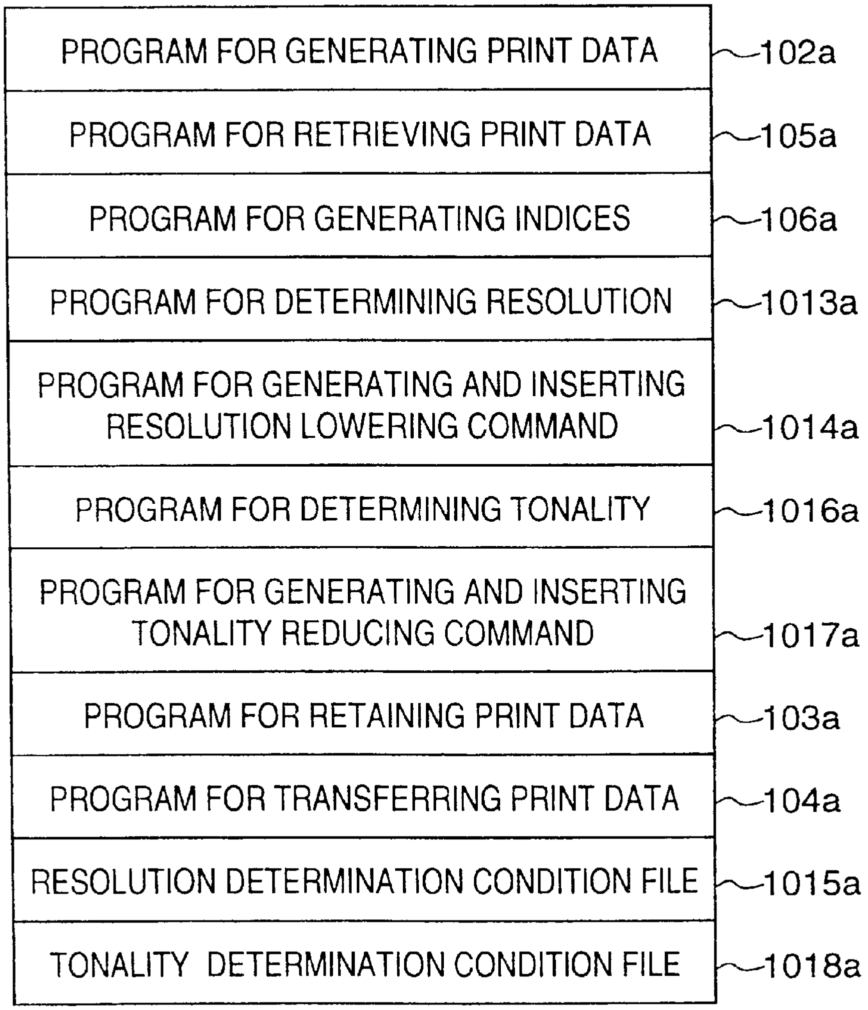
FIGS. 14A and 14B illustrate programs for constructing the printing control apparatus (printer driver) in the printing system of FIG. 11.
Figure 14B:
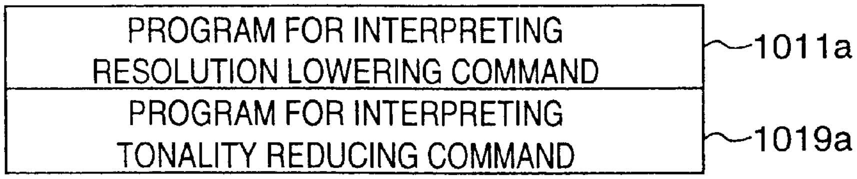

A second embodiment of the present invention will now be described with reference to FIGS. 11 through 13. FIG. 11 is a block diagram illustrating the architecture of a printing control apparatus (printer driver) in a printing system according to a second embodiment of the present invention, FIG. 12 is a diagram showing the content of the print-data retention file in FIG. 11 in which a resolution lowering command has been inserted, FIG. 13 is flowchart illustrating processing for inserting a resolution lowering command and a command for lowering the number of tones into a file by the image processing apparatus in the printing system of FIG. 11, and FIG. 14A and 14B illustrate programs for constructing the printing control apparatus (printer driver) in the printing system of FIG. 11.

As shown in FIG. 11, the printing system according to this embodiment includes an information processing apparatus 101 and a printer 1010. The printer driver constructed in the information processing apparatus 101 has a print-data generating unit 102 for generating print data. The print data generated is stored temporarily in a memory such as a RAM in a binary format as a print-data retention file (referred to as a "file" below) 107 by a print-data retaining unit 103. The file 107 that has been stored in the memory is read out by the print-data retaining unit 103 and applied to a print-data retrieval unit 105. The latter searches the content of the file 107 and extracts data for generating indices that indicate the characteristics of the file 107. The data extracted by the print-data retrieval unit 105 on a per-page basis is applied to an index generating unit 106 after being stored in the memory. The index generating unit 106 generates indices representing the characteristics of the file 107 using the data extracted per each page by the print-data retrieval unit 105. The job index and the page index of each page thus created are stored in the memory.

The job index and the page index of each page stored in the memory are applied to a resolution determination unit 1013 and a tonality determination unit 1016. On the basis of the job index and page indices, the resolution determination unit 1013 performs a test to determine whether resolution determination conditions 1015 are satisfied. The resolution determination conditions 1015 are decided from control conditions which include the memory storage capacity that can be utilized in processing for developing the print data into image data, as well as the printout speed of the printer 1010. On the basis of the test results, the resolution determination unit 1013 determines whether resolution modification processing for lowering resolution is necessary or not. More specifically, the resolution determination unit 1013 judges whether the job index or page index satisfies the resolution determination conditions 1015. When the job index or page index satisfies the resolution determination conditions 1015, it is judged that execution of resolution modification processing is required. The resolution determination conditions 1015 comprise the following conditions (1)~(4) and enlargement/reduction conditions, which are read out of memory such as a RAM in advance:

(1) the transmission data size per page is greater than four megabytes;

(2) the transmission data size per job is greater than 16 megabytes;

(3) the color image size is greater than 100×100 dots; and (4) the monochrome image size is greater than size A4.

On the basis of the job index and page indices, the tonality determination unit 1016 performs a test to determine whether tonality determination conditions 1018 are satisfied. The tonality determination conditions 1018 are decided from the memory storage capacity that can be utilized in processing for developing the print data into image data in the printer 1010, as well as the printout speed of the printer 1010. On the basis of the test results, the tonality determination unit 1016 determines whether tonality modification processing for reducing the number of tones is necessary or not. More specifically, the tonality determination unit 1016 judges whether the job index or page index satisfies the tonality determination conditions 1018. When the job index or page index satisfies the tonality determination conditions 1018, it is judged that execution of tonality modification processing is required. The tonality determination conditions 1018 comprise the following conditions (5)~(7), which are read out of memory such as a RAM in advance:

(5) the transmission data size per page is greater than 16 megabytes;

(6) the transmission data size per job is greater than 20 megabytes; and (7) the color image size of 24 bits/pixel is greater than 2500×2500 dots.

If the resolution determination unit 1013 determines that resolution modification processing is necessary, a command generating unit 1014 which generates a resolution lowering command inserts the resolution lowering command into the file 107, thereby obtaining a file 108 having the inserted resolution lowering command. More specifically, as shown in FIG. 12, the resolution lowering command is represented by "ESC>[$$$<ESC>[###" and is inserted after a [printing environment setting instruction group] in the file 108. Similarly, if the tonality determination unit 1016 determines that tonality modification processing is necessary, a command generating unit 1017 which generates a command for reducing the number of tones inserts this command into the file 108 at a prescribed location thereof.

The file 108 in which the command for lowering resolution and the command for reducing the number of tones have been inserted is transferred by a print-data transfer unit 104 to the printer 1010 via the I/F 1012.

The print-data generating unit 102, print-data retaining unit 103, print-data retrieval unit 105, index generating unit 106, resolution determination unit 1013, resolution lowering command generating unit 1014, tonality determination unit 1016, a tonality reducing command generating unit 1017 and print-data transfer unit 104 are implemented by programs that have been stored in an auxiliary storage device or the like. More specifically, as shown in FIG. 14A, the print-data generating unit 102, print-data retaining unit 103, print-data retrieval unit 105, index generating unit 106, resolution determination unit 1013, resolution lowering command generating unit 1014, tonality determination unit 1016, tonality reducing command generating unit 1017 and print-data transfer unit 104 are implemented by a program 102*a* for generating print data, a program 103*a* for retaining print data, a program 105*a* for retrieving print data, a program 106*a* for generating indices, a program 1013*a* for determining resolution, a program 1014*a* for generating and inserting the command which lowers resolution, a program 1016*a* for determining tonality, a program 1017*a* for generating and inserting the command which reduces the number of tones, and a program 104*a* for transferring print data, respectively. The resolution determination conditions 1015 is stored as a resolution determination condition file 1015*a*, and the tonality determination conditions 1018 is stored as a tonality determination condition file 1018*a*.

The printer 1010 has a resolution lowering command interpreting unit 1011 and a tonality reducing command interpreting unit 1019 for finding the resolution lowering command or the tonality reducing command from the print data that has been received. When the resolution lowering command or tonality reducing command has been found by the resolution lowering command interpreting unit 1011 or tonality reducing command interpreting unit 1019, the printer 1010 executes resolution modification processing or tonality modification processing. The resolution lowering command interpreting unit 1011 and the tonality reducing command interpreting unit 1019 are implemented by a program 1011*a* for interpreting the resolution lowering command and a program 1019*a* for interpreting the tonality reducing command, which are shown in FIG. 14B.

Processing in the information processing apparatus 101 for generating and inserting the command for lowering resolution and the command for reducing the number of tones in the information processing apparatus 101 will be described with reference to FIG. 13.

First, it is determined whether the job index or page index conforms to the resolution determination conditions 1015 or tonality determination conditions 1018 (step S1201). When it is determined that the job index or page index satisfies the resolution determination conditions 1015 or tonality determination conditions 1018, the command for lowering resolution or the command for reducing the number of tones is generated and inserted (step S1202).

Thus, according to this embodiment, a command for lowering resolution or a command for reducing the number of tones is inserted on the side of the information processing apparatus 101 when it is necessary to execute resolution/tonality modification processing in the printer 1010. This makes it easy for the printer 1010 to determine, based upon whether or not the command for lowering resolution or the command for reducing the number of tones has been inserted into the file 108, whether or not the resolution/tonality modification processing is to be executed. Consequently, the processing load in the printer 1010 relating to the decision as to whether or not to execute the resolution/tonality modification processing can be reduced.

(Third Embodiment)

Figure 15:
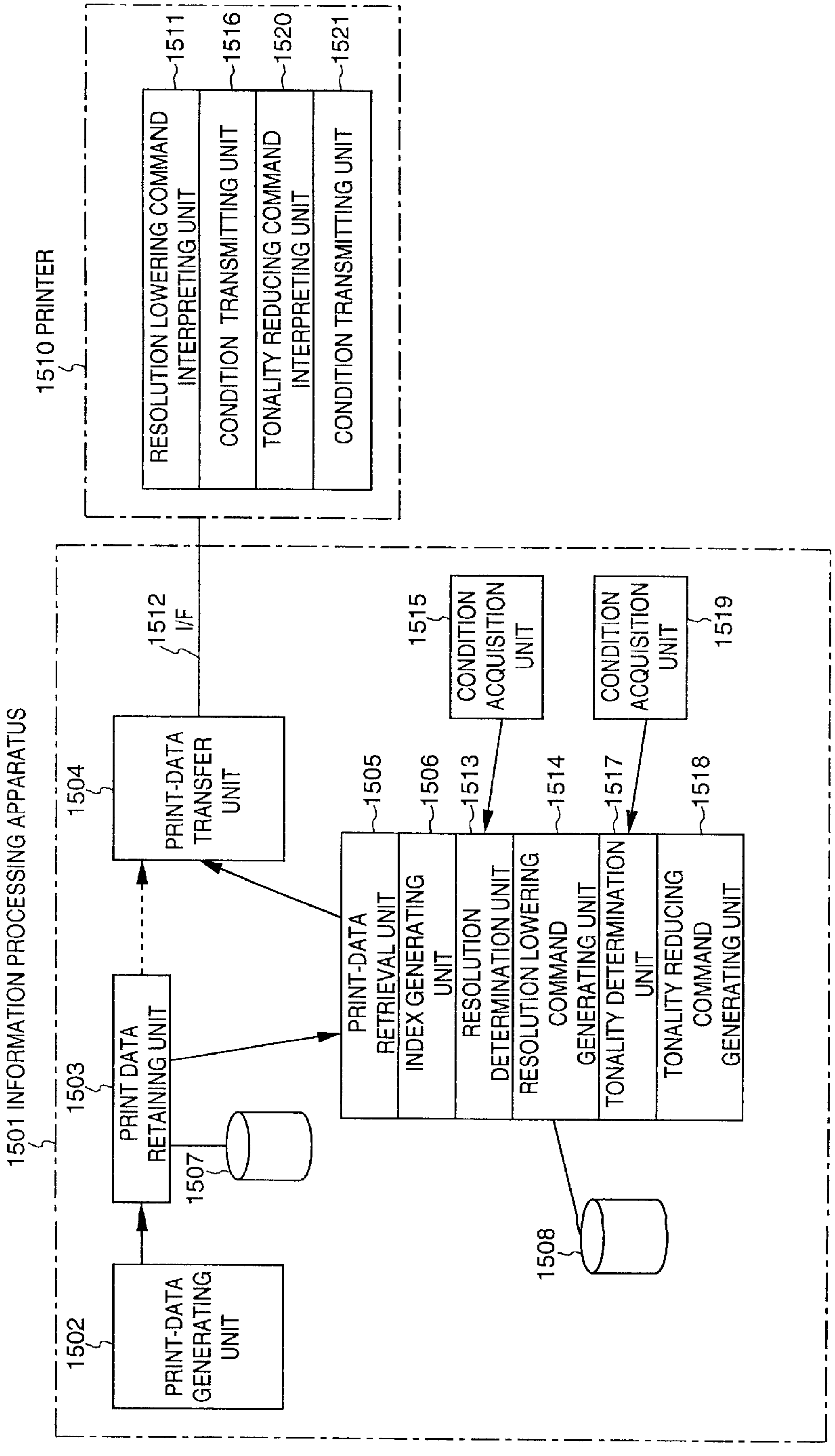
FIG. 15 is a block diagram illustrating the architecture of a printing control apparatus (printer driver) in a printing system according to a third embodiment of the present invention.

A third embodiment of the present invention will now be described with reference to FIGS. 15 and 16A and 16B. FIG. 15 is a block diagram illustrating the architecture of a printing control apparatus (printer driver) in a printing system according to a third embodiment of the present invention, and FIGS. 16A and 16B illustrate programs for constructing the printing control apparatus (printer driver) in the printing system of FIG. 15.

As shown in FIG. 15, the printing system according to this embodiment includes an information processing apparatus 1501 and a printer 1510. The printer driver constructed in the information processing apparatus 1501 has a print-data generating unit 1502, a print-data retention unit 1503, a print-data retrieval unit 1505 and an index generating unit 1506.

The job index and the page index of each page that have been generated are applied to a resolution determination unit 1513 and a tonality determination unit 1517. In a manner similar to that of the second embodiment, the resolution determination unit 1013 determines whether the job index and page indices satisfy the resolution determination conditions and, based upon the results, determines whether it is necessary to execute resolution modification processing for lowering resolution. More specifically, it is determined whether the job index and page indices satisfy the resolution determination conditions. When the job index or page index satisfies the resolution determination conditions, it is judged that execution of resolution modification processing is required. The resolution determination conditions are acquired from the printer 1510 by a condition acquisition unit 1515. The resolution determination conditions acquired comprise the conditions illustrated in the second embodiment. That is, the printer 1510 decides the values corresponding to the data sizes and images sizes of conditions (1)~(7) from the memory capacity and printing speed of the printer 1510 and sends these values to the information processing apparatus 1501.

A tonality determination unit 1517, on the other hand, determines whether the job index and pages indices satisfy tonality determination conditions acquired from the printer 1510 by a condition acquisition unit 1519 and, based upon the results, determines whether it is necessary to execute tonality modification processing for reducing the number of tones. More specifically, it is determined whether the job index and page indices satisfy the tonality determination conditions. When the job index or page index satisfies the resolution determination conditions, it is judged that execution of tonality modification processing is required. The tonality determination conditions comprise the conditions illustrated in the second embodiment.

If the resolution determination unit 1513 determines that the resolution modification processing is required, a command generating unit 1514 which generates a resolution lowering command inserts the resolution lowering command into the file 1507, thereby obtaining a file 1508 having the inserted resolution lowering command. Similarly, if the tonality determination unit 1517 determines that the tonality modification processing is required, a command generating unit 1518 which generates a command for reducing the number of tones inserts this command into the file 1507, thereby obtaining the file 1508 having the inserted command for reducing the number of tones.

The file 1508 in which the command for lowering resolution and the command for reducing the number of tones have been inserted is transferred by a print-data transfer unit 1404 to the printer 1510 via the I/F 1512.

The print-data generating unit 1502, print-data retention unit 1503, print-data retrieval unit 1505, index generating unit 1506, condition acquisition unit 1515, resolution determination unit 1513, resolution lowering command generating unit 1514, condition acquisition unit 1519, tonality determination unit 1517, tonality reducing command generating unit 1518 and print-data transfer unit 1504 are implemented by programs that have been stored in an auxiliary storage device or the like. More specifically, as shown in FIG. 16A, the print-data generating unit 1502, print-data retention unit 1503, print-data retrieval unit 1505, index generating unit 1506, condition acquisition unit 1515, resolution determination unit 1513, resolution lowering command generating unit 1514, condition acquisition unit 1519, tonality determination unit 1517, tonality reducing command generating unit 1518 and print-data transfer unit 1504 are implemented by a program 1502*a* for generating print data, a program 1503*a* for retaining print data, a program 1505*a* for retrieving print data, a program 1506*a* for generating indices, a program 1515*a* for acquiring the resolution determination conditions, a program 1513*a* for determining resolution, a program 1514*a* for generating and inserting the command which lowers resolution, a program 1519*a* for acquiring the tonality determination conditions, a program 1017*a* for determining tonality, a program 1518*a* for generating and inserting the command which reduces the number of tones, and program 1504*a* for transferring print data, respectively.

The printer 1510 has a resolution lowering command interpreting unit 1511 and a tonality reducing command interpreting unit 1520 for finding the resolution lowering command or the tonality reducing command from the print data that has been received, a condition transmitting unit 1516 for transmitting the resolution determination conditions to the information processing apparatus 1501, and a condition transmitting unit 1521 for transmitting the tonality determination conditions to the information processing apparatus 1501. When the resolution lowering command or tonality reducing command has been found by the resolution lowering command interpreting unit 1511 or tonality reducing command interpreting unit 1520, the printer 1510 executes resolution modification processing or tonality modification processing.

The resolution lowering command interpreting unit 1511, tonality reducing command interpreting unit 1520, condition transmitting unit 1516 and condition transmitting unit 1521 are implemented by a resolution lowering command interpreting program 1511*a,* a tonality reducing command interpreting program 1519*a,* a program 1516*a* for transmitting the resolution determination conditions and a program 1521*a* for transmitting the tonality determination conditions. These programs are illustrated in FIG. 16B.

Thus, according to this embodiment, the resolution determination conditions and the tonality determination conditions are acquired from the printer 1510. As a result, the resolution determination conditions and the tonality determination conditions can be set easily and highly precisely in conformity with a change in the specifications of the printer 1510.

(Fourth Embodiment)

Figure 17:
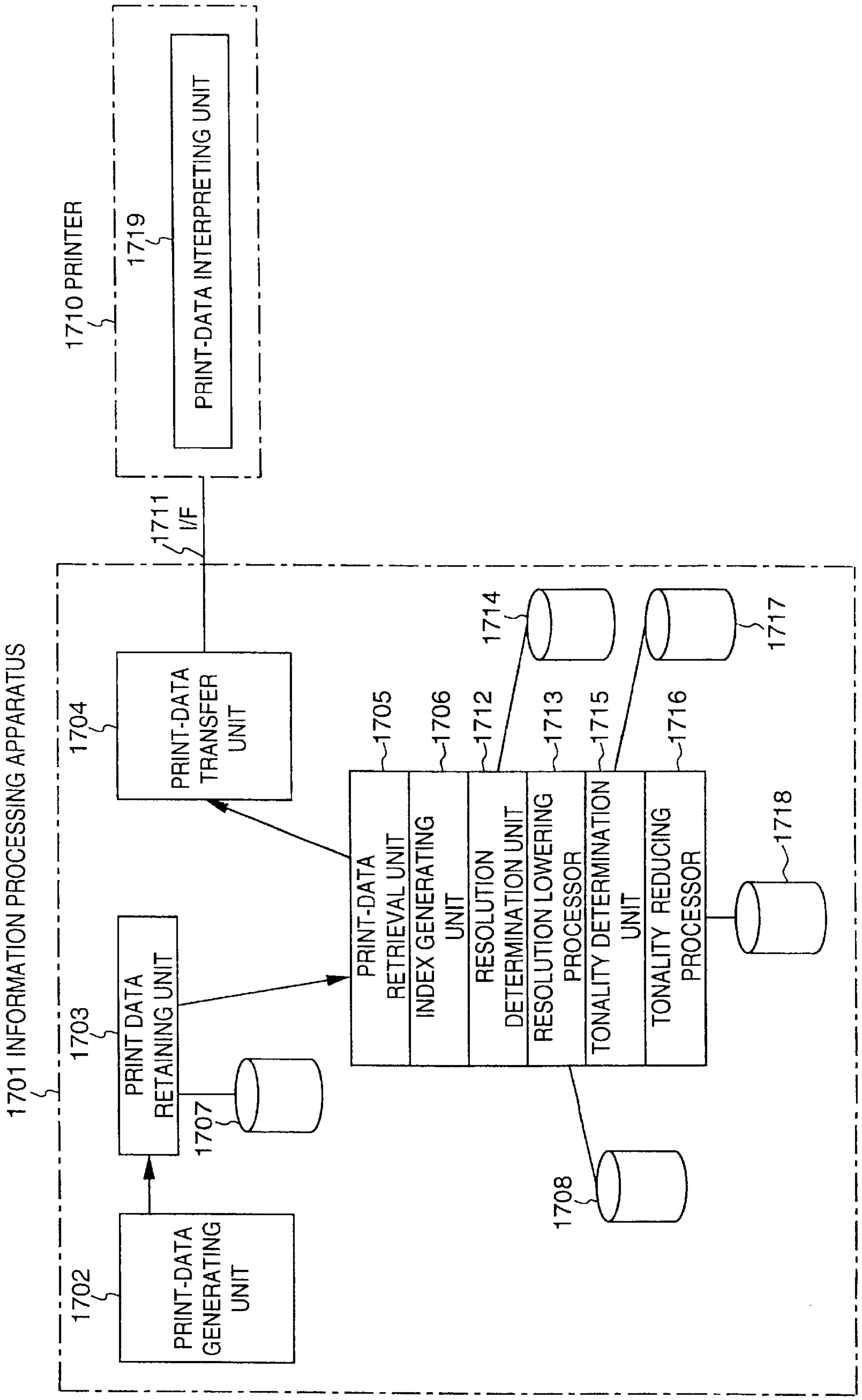
FIG. 17 is a block diagram illustrating the architecture of a printing control apparatus (printer driver) in a printing system according to a fourth embodiment of the present invention.
Figure 18A:
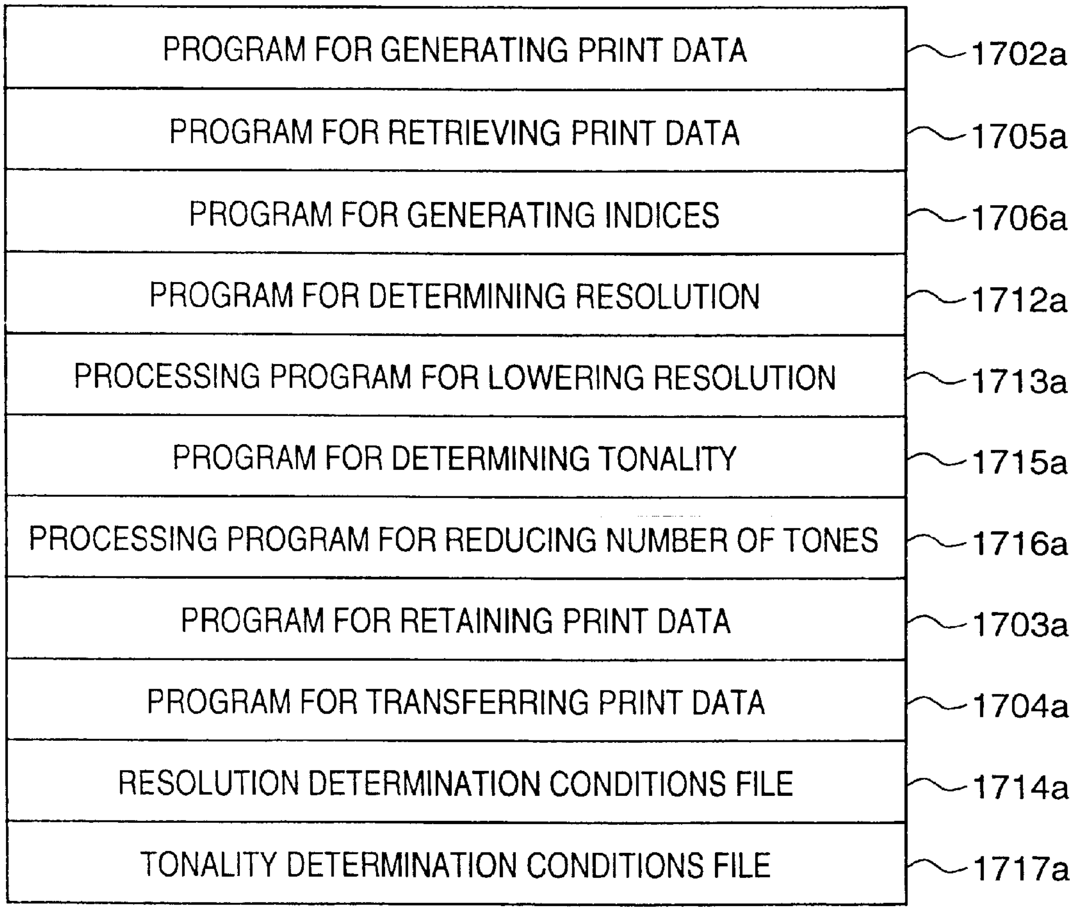
FIGS. 18A and 18B illustrate programs for constructing the printing control apparatus (printer driver) in the printing system of FIG. 17.
Figure 18B:

A fourth embodiment of the present invention will now be described with reference to FIGS. 17 and 18A and 18B. FIG. 17 is a block diagram illustrating the architecture of a printing control apparatus (printer driver) in a printing system according to a fourth embodiment of the present invention, and FIG. 18A and 18B illustrate programs for constructing the printing control apparatus (printer driver) in the printing system of FIG. 17.

As shown in FIG. 17, the printing system according to this embodiment includes an information processing apparatus 1701 and a printer 1710. The printer driver constructed in the information processing apparatus 1701 has a print-data generating unit 1702, a print-data retention unit 1703, a print-data retrieval unit 1705 and an index generating unit 1706.

The job index and the page index of each page that have been generated are applied to a resolution determination unit 1712 and a tonality determination unit 1715. On the basis of the job index and page indices, the resolution determination unit 1712 performs a test to determine whether resolution determination conditions described in a resolution determination conditions file 1714 are satisfied. On the basis of the test results, the resolution determination unit 1712 determines whether resolution modification processing for lowering resolution is necessary or not. More specifically, the resolution determination unit 1712 judges whether the job index or page index satisfies the resolution determination conditions. When the job index or page index satisfies the resolution determination conditions, it is judged that execution of resolution modification processing is required. These resolution determination conditions comprise the conditions illustrated in the second embodiment.

The tonality determination unit 1715, on the other hand, performs a test to determine whether resolution determination conditions described in a tonality determination conditions file 1717 are satisfied. On the basis of the test results, the tonality determination unit 1715 determines whether tonality modification processing for reducing the number of tones is necessary or not. More specifically, the tonality determination unit 1715 judges whether the job index or page index satisfies the tonality determination conditions. When the job index or page index satisfies the tonality determination conditions, it is judged that execution of tonality modification processing is required. These tonality determination conditions comprise the conditions illustrated in the second embodiment.

If the resolution determination unit 1712 determines that resolution modification processing is necessary, then a resolution lowering processor 1713 converts the print data of file 1707 to print data of a lowered resolution, thereby obtaining a file 1708 comprising print data of lowered resolution. Similarly, if the tonality determination unit 1715 determines that tonality modification processing is necessary, then a processor 1716 for reducing the number of tones converts the print data of file 1707 or the print data of file 1708 to print data of a smaller number of tones, thereby obtaining a file 1718 comprising print data of a reduced number of tones.

The file 1718 is transferred by a print-data transfer unit 1704 to the printer 1710 via the I/F 1711.

The print-data generating unit 1702, print-data retaining unit 1703, print-data retrieval unit 1705, index generating unit 1706, resolution determination unit 1712, resolution lowering processor 1713, tonality determination unit 1715, tonality reducing processor 1716 and print-data transfer unit 1704 are implemented by programs that have been stored in an auxiliary storage device or the like. More specifically, as shown in FIG. 19A, the print-data generating unit 1702, print-data retaining unit 1703, print-data retrieval unit 1705, index generating unit 1706, resolution determination unit 1712, resolution lowering processor 1713, tonality determination unit 1715, tonality reducing processor 1716 and print-data transfer unit 1704 are implemented by a program 1702*a* for generating print data, a program 1703*a* for retaining print data, a program 1705*a* for retrieving print data, a program 1706*a* for generating indices, a program 1712*a* for determining resolution, a processing program 1713*a* for lowering resolution, a program 1715*a* for determining tonality, a processing program 1716*a* for reducing the number of tones, and a program 1704*a* for transferring print data, respectively. The resolution determination conditions file 1714 and the resolution determination conditions file 1717 are provided in the information processing apparatus 1701.

The printer 1710 has a print-data interpretation unit 1719 for interpreting the print data of reduced resolution or reduced number of tones. The print-data interpretation unit 1719 is implemented by a print-data interpretation program 1719*a* shown in FIG. 18B.

Thus, according to this embodiment, processing for altering resolution/tonality is executed in the information processing apparatus 1701 whenever necessary. This makes it unnecessary for the printer 1710 to execute processing relating to modification of resolution/tonality. Even when resolution/tonality modification processing is required, therefore, it is possible raise the printout speed of the printer 1710.

(Fifth Embodiment)

Figure 19:
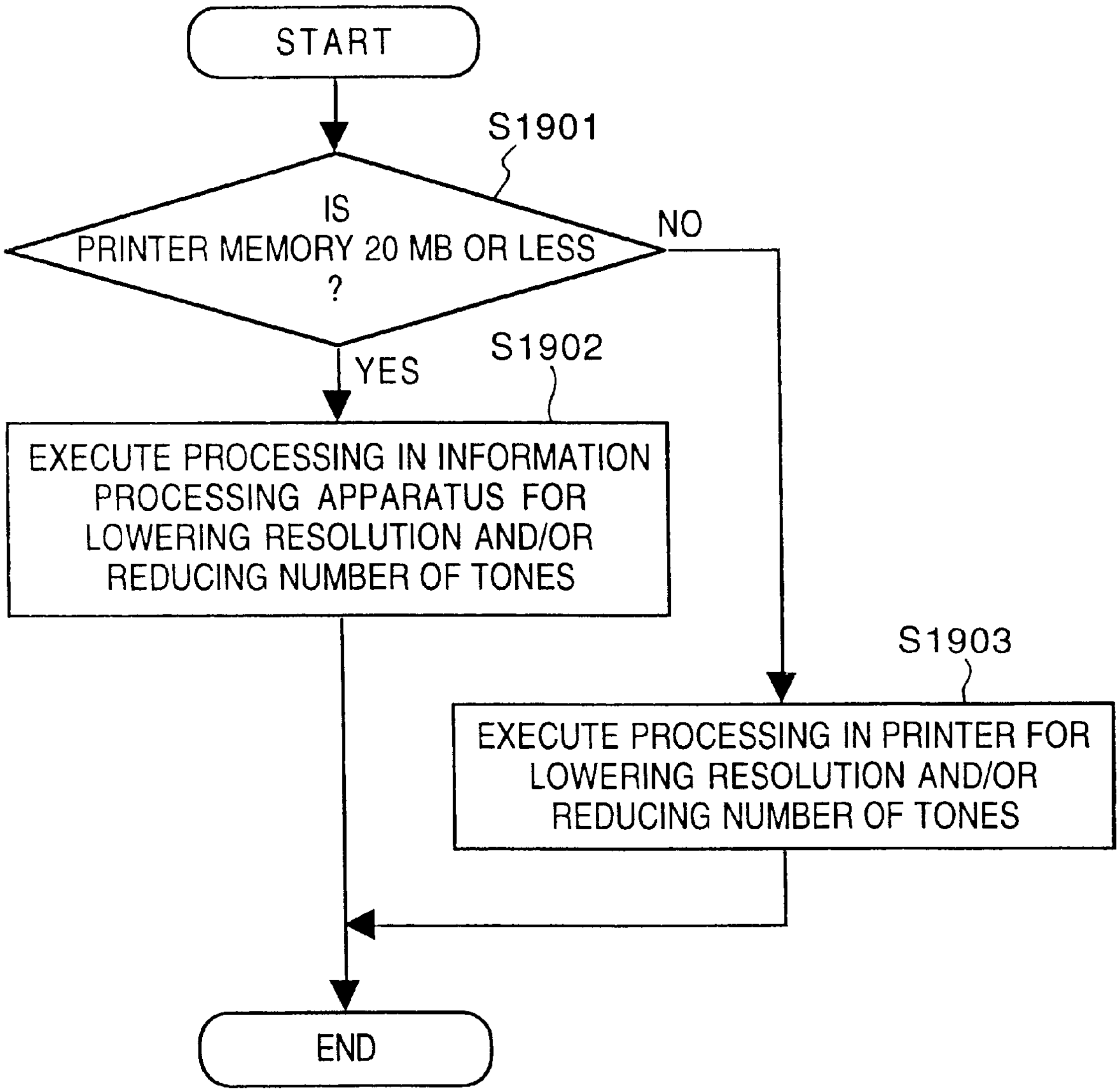
FIG. 19 is a flowchart illustrating resolution/tonality modification processing in a printing system according to a fifth embodiment of the present invention.

A fifth embodiment of the present invention will now be described with reference to FIG. 19. FIG. 19 is a flowchart illustrating resolution/tonality modification processing in a printing system according to a fifth embodiment of the present invention.

According to this embodiment, the information processing apparatus and the printer are each equipped with a resolution/tonality modification processing function, selection processing is executed for selecting, in dependence upon the memory capacity of the printer, whether the resolution/tonality modification processing is to be executed on the side of the information processing apparatus or on the side of the printer, and the resolution/tonality modification processing is executed, when necessary, on the side selected. The selection processing is performed on the side of the information processing apparatus, which is so adapted as to be capable of acquiring the memory capacity from the printer.

The processing for selecting the apparatus that is to execute the resolution/tonality modification processing in this embodiment will now be described with reference to the flowchart of FIG. 19.

First, the memory capacity with which the printer is provided is acquired and it is determined whether the acquired memory capacity is 20 megabytes or less (step S1901). If the memory capacity with which the printer is provided is 20 megabytes or less, a setting is made in such a manner that processing for lowering resolution and/or reducing the number of tones is executed in the information processing apparatus (step S1902). If the memory capacity of the printer exceeds 20 megabytes, a setting is made in such a manner that processing for lowering resolution and/or reducing the number of tones is executed in the printer (step S1903).

Thus, it is determined, based upon the printer memory capacity, which has the higher processing capability, the information processing apparatus or the printer, and the apparatus which executes the resolution/tonality modification processing is selected based upon the determination made. This makes it possible to execute the resolution/tonality modification processing at a higher speed.

In this embodiment, the apparatus which executes the resolution/tonality modification processing is selected in conformity with the printer memory capacity. However, it is possible to adopt an arrangement in which the apparatus which executes the resolution/tonality modification processing is selected by an input from the user.

(Sixth Embodiment)

Figure 20:
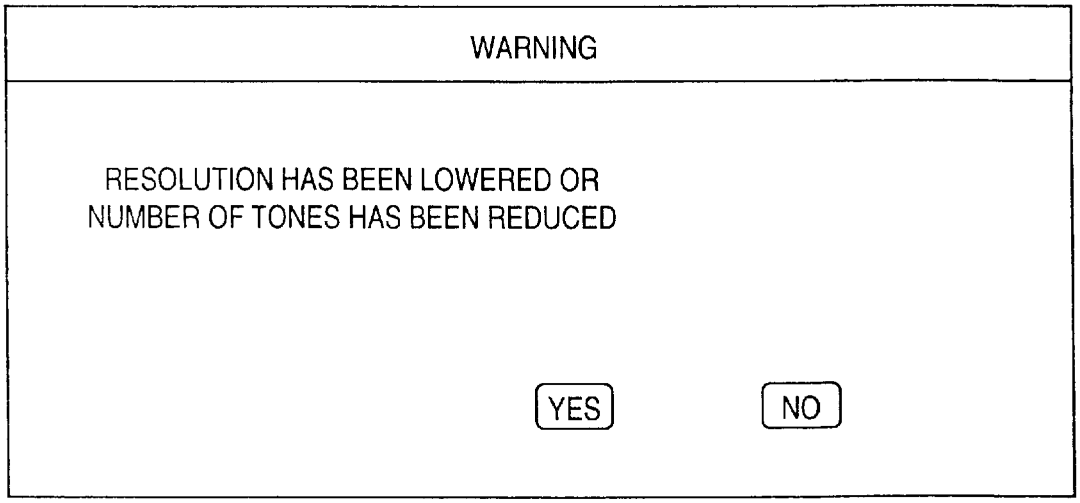
FIG. 20 is a diagram illustrating an example of a display screen which, when it is necessary to execute resolution/tonality modification processing in a printing system according to a sixth embodiment of the present invention, informs the user of this fact and allows the user to select whether or not the printing job is to be continued.

A sixth embodiment of the present invention will now be described with reference to FIG. 20. FIG. 20 is a diagram illustrating an example of a display screen which, when it is necessary to execute resolution/tonality modification processing in a printing system according to a sixth embodiment of the present invention, informs the user of this fact and allows the user to select whether or not the printing job is to be continued.

Figure 21:
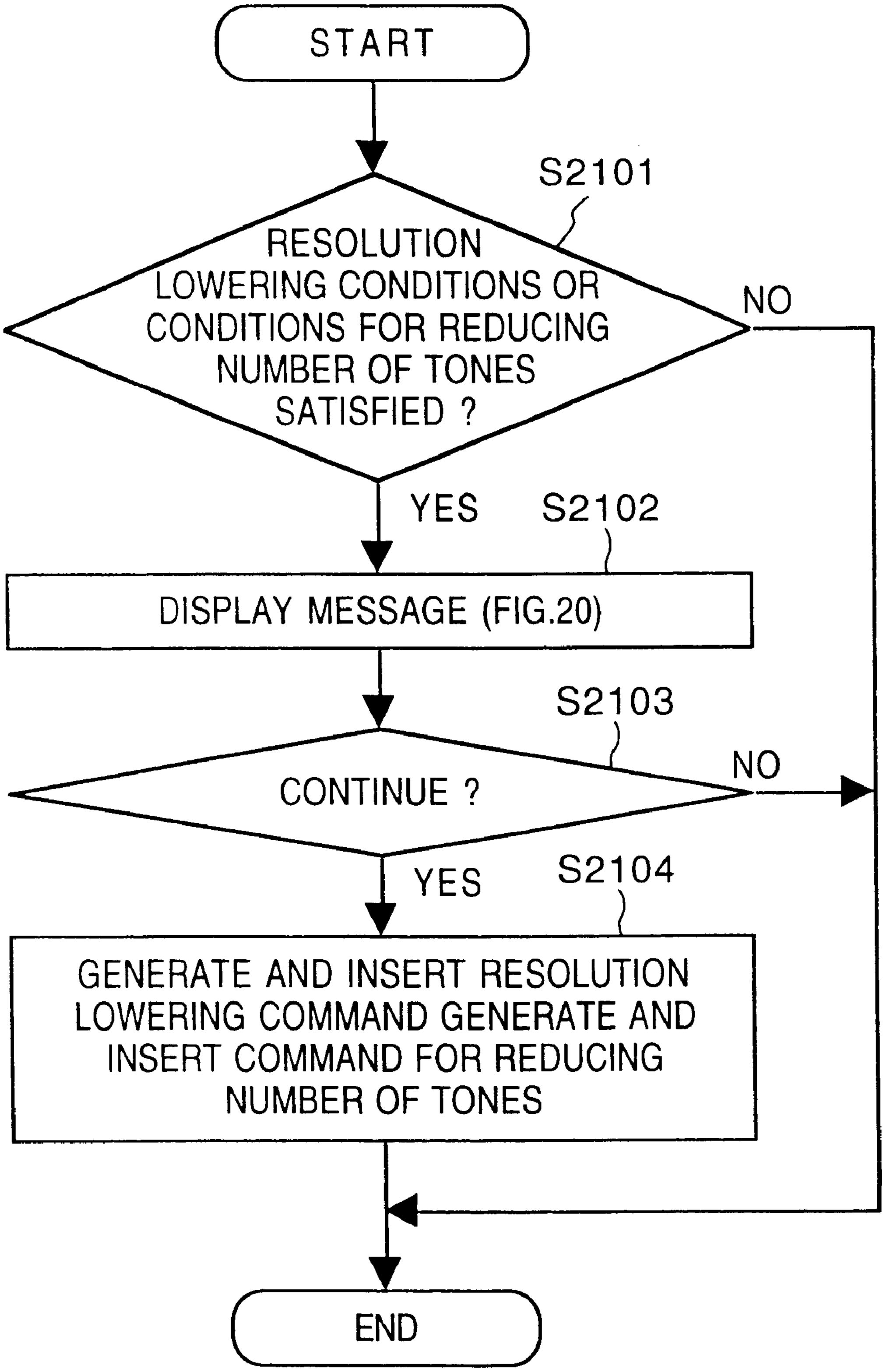
FIG. 21 is a flowchart of processing according to the sixth embodiment.

According to this embodiment, the information processing apparatus controls the display to notify the user of the need to execute resolution/tonality modification processing when such processing is necessary, and to allow the user to select whether or not the printing job is to be continued. The procedure is illustrated in FIG. 21.

According to this embodiment, it is determined at step S2101 whether execution of resolution/tonality modification processing is necessary. If execution of this processing is necessary, a message to this effect ("RESOLUTION HAS BEEN LOWERED OR NUMBER OF TONES HAS BEEN REDUCED") is displayed as well as buttons and a message that allow the user to select whether or not the printing job is to be continued (S2102). The message display regarding whether or not the printing job is to be continued is "CONTINUE PRINTING?", and the buttons for responding to the message are "YES" and "NO". The messages and buttons are displayed on a CRT. The printing job is continued if "YES" is selected by the input unit, and the printing job is terminated if "NO" is selected by the input unit. If the printing job is continued, a command for lowering resolution or reducing the number of tones is generated and sent to the printer at step S2104. The print data may be manipulated in the manner described in the fourth embodiment.

Thus, the information processing apparatus controls the display to notify the user of the need to execute resolution/tonality modification processing when such processing is necessary, and to allow the user to select whether or not the printing job is to be continued. As a result, the user can be notified beforehand of execution of the resolution/tonality modification processing and can select continuation or termination of the printing job which, if continued, will be accompanied by execution of the resolution/tonality modification processing.

In accordance with the printing system of the foregoing embodiments, as described above, the likelihood that memory capacity will be exceeded or that printer overrun will occur is examined before development of image data is executed, and resolution or number of tones is changed in dependence upon the results of the examination. This makes it possible to execute resolution/tonality modification processing, by which resolution is lowered or number of tones reduced, without lowering printout speed.

Further, whether or not resolution/tonality modification processing is necessary can be decided by the printer based upon indices created by the information processing apparatus.

Further, in the second embodiment, whether resolution and/or number of tones is to be changed is judged by the information processing apparatus. This makes it easy to confirm, on the side of the printer, whether or not execution of resolution/tonality modification processing is necessary.

Further, since control conditions are acquired from the printer, optimum control conditions conforming to the specifications of the printer can be obtained and it is easy to deal with a change in control conditions that accompanies a change in the specifications of the printer.

Further, when a decision is rendered to the effect that resolution/tonality modification processing is required, this processing is applied to the print data in the information processing apparatus and the processed print data are transferred from the information processing apparatus to the printer. As a result, the processing load involved in resolution/tonality modification processing can be reduced on the side of the printer.

Further, when a decision is rendered to the effect that resolution/tonality modification processing is required, either the information processing apparatus or the printer is selected to execute this processing. This makes it possible to select whichever device is capable of executing resolution/tonality modification processing at the higher speed.

Further, when a decision is rendered to the effect that resolution/tonality modification processing is required, the user confirms whether printout of the corresponding print data is to be continued or not. Accordingly, the user can be notified beforehand of the fact that resolution/tonality modification processing will be executed and can select, depending upon the circumstances, whether or not to continue printout of image data that will undergo resolution/tonality modification processing.

As many apparently widely different embodiments of the present invention can be made without departing from the spirit and scope thereof, it is to be understood that the invention is not limited to the specific embodiments thereof except as defined in the appended claims.

What is claimed is:

1. A printing system having a host and a printing apparatus in which both a resolution and a number of tones are capable of being changed over, the system comprising:

index creating means for creating index information indicating a characteristic of print data;

decision means for deciding one of a plurality of printing modes, based upon the characteristic obtained from the index information, wherein the plurality of printing modes include a first printing mode in which it is necessary to lower the resolution when the print data is printed by the printing apparatus and a second printing mode in which it is necessary to lower a number of tones when the print data is printed by the printing apparatus; and control means for causing the print data to be printed at a resolution lower than an original resolution when said decision means decides the first printing mode as the printing mode, and causing the print data to be printed with a number of tones smaller than an original number of tones when said decision means decides the second printing mode as the printing mode.

2. The system according to claim 1, wherein the characteristic includes a quantity of data and an image size, said decision means compares the quantity of data and the image size obtained from the index information with prescribed values decided from a capacity of a memory possessed by the printing apparatus and a printing speed of the printing apparatus, and decides the first or second printing mode as the printing mode when the quantity of data or the image size is greater than the relevant prescribed value.

3. The system according to claim 1, wherein said index creating means creates index information that includes types of objects included in the print data, a number of objects of each type and a data size per each type.

4. The system according to claim 1, wherein said index creating means is included in the host, said decision means and said control means are included in the printing apparatus, said host sends the index information to the printing apparatus together with the print data and the printing apparatus prints the print data based upon the index information and print information received.

5. The system according to claim 1, wherein said index creating means and said decision means are included in the host, said control means is included in the printing apparatus, the host sends the printing apparatus an instruction whereby the control means causes the printing apparatus to print the print data at a resolution lower than the original resolution or with a number of tones smaller than the original number of tones, and the printing apparatus prints the print data in accordance with the instruction received.

6. The system according to claim 5, wherein the characteristic of the print data includes a quantity of data and an image size, said decision means compares the quantity of data and the image size obtained from the index information with prescribed values decided from a capacity of a memory possessed by the printing apparatus and a printing speed of the printing apparatus, wherein the capacity of the memory and the printing speed are acquired from the printing apparatus, and decides the first or second printing mode as the printing mode if the quantity of data or the image size is greater than the relevant prescribed value.

7. The system according to claim 1, wherein said index creating means, said decision means and said control means are included in the host, the host converts the print data to print data having a resolution lower than the original resolution or a number of tones smaller than the original number of tones by using said control means, and transmits the resulting print data to the printing apparatus.

8. The system according to claim 1, wherein said control means is provided in the host and in the printing apparatus, and said system further comprises means which, in dependence upon a capacity of a memory possessed by the printing apparatus, changes over between control performed by the control means of the host and control performed by the control means of the printing apparatus, said control means causing the print data to be printed at a resolution lower than the original resolution or with a number of tones smaller than the original number of tones.

9. The system according to claim 1, wherein said control means has means which is operable, if said decision means decides the first or second printing mode as the printing mode, for displaying this fact and allowing an operator to enter whether processing is to be continued or not, the print data being printed at a resolution lower than the original resolution in the first printing mode or with a number of tones smaller than the original number of tones in the second printing mode if an entry to the effect that processing is to be continued has been entered.

10. The system according to claim 1, wherein the index information includes job index information regarding all print data to be printed, and page index information for each page, said decision means decides whether it is necessary to lower the resolution or the number of tones based upon the job index information and the page index information, and said control means prints all print data upon lowering the resolution or the number of tones with regard to all of the print data if said decision means has decided, based upon the job index, that it is necessary to lower the resolution or the number of tones, and prints print data from a particular page onward upon lowering the resolution or the number of tones with regard to the particular page onward if said decision means has decided, based upon the page index information, that it is necessary to lower the resolution or the number of tones.

11. The system according to claim 1, wherein said decision means judges the necessity to lower the resolution and judges the necessity to lower the number of tones based upon different standards, and said control means causes printing to be performed upon lowering the resolution in a case where it has been judged necessary to lower the resolution, and causes printing to be performed upon lowering the number of tones in a case where it has been judged necessary to lower the number of tones.

12. An information processing apparatus for generating print data for controlling a printing apparatus in which both a resolution and a number of tones are capable of being changed over, said apparatus comprising:

index creating means for creating index information indicating a characteristic of original print data;

decision means for deciding one of a plurality of printing modes, based upon the characteristic information obtained from the index information, wherein the plurality of printing modes includes a first printing mode in which it is necessary to lower the resolution when the print data is printed by the printing apparatus and a second printing mode in which it is necessary to lower the number of tones when the print data is printed by the printing apparatus; and generation means for generating print data to be printed by the printing apparatus in accordance with the decided printing mode, so that the print data is printed at a resolution lower than an original resolution when said decision means decides the first print mode as the printing mode, and the print data is printed with a number of tones smaller than an original number of tones when said decision means decides the second printing mode as the printing mode.

13. The apparatus according to claim 12, wherein the characteristic includes a quantity of data and an image size, said decision means compares the quantity of data and the image size obtained from the index information with prescribed values decided from a capacity of a memory possessed by the printing apparatus and a printing speed of the printing apparatus, and decides the first or second printing mode as the printing mode, if the quantity of data or the image size is greater than the relevant prescribed value.

14. The apparatus according to claim 12, wherein said index creating means creates index information that includes types of objects included in the original print data, a number of objects of each type and a data size per each type.

15. The apparatus according to claim 12, wherein said generation means generates the print data including an instruction which causes the printing apparatus to print the print data at a resolution lower than the original resolution or with a number of tones smaller than the original number of tones.

16. The apparatus according to claim 15, further comprising an acquisition means for acquiring a capacity of a memory possessed by the printing apparatus and printing speed of the printing apparatus, or conditions decided from the capacity of the memory and the printing speed, and said decision means decides the printing mode based upon conditions acquired by said acquisition means.

17. The apparatus according to claim 12, wherein said generation means converts the original print data to print data having a resolution lower than the original resolution or a number of tones smaller than the original number of tones, and transmits the resulting print data to the printing apparatus.

18. The apparatus according to claim 12, further comprising means which, in dependence upon a capacity of a memory possessed by the printing apparatus, determines changing-over between control performed by the host and control performed by the printing apparatus, said control causing the print data to be printed at a resolution lower than the original resolution or with a number of tones smaller than the original number of tones.

19. The apparatus according to claim 12, wherein said generation means has means which is operable, if said decision means decides the first or second printing mode as the printing mode, for displaying this fact and allowing an operator to enter whether processing is to be continued or not, the print data being printed at a resolution lower than the original resolution in the first printing mode or with a number of tones smaller than the original number of tones in the second printing mode if an entry to the effect that processing is to be continued has been entered.

20. The apparatus according to claim 12, wherein the index information includes job index information regarding all print data to be printed, and page index information for each page, said decision means decides the printing mode based upon the job index information and the page index information, and said generation means generates all print data upon lowering resolution or number of tones with regard to all of the print data if said decision means has decided, based upon the job index, the first or second printing mode as the printing mode, and generates print data from a particular page onward upon lowering the resolution or number of tones with regard to the particular page onward if said decision means has decided, based upon the page index information, the first or second printing mode as the printing mode.

21. The apparatus according to claim 12, wherein said decision means judges the necessity to lower the resolution and judges the necessity to lower the number of tones based upon different standards, and said generation means generates the print data which causes printing to be performed upon lowering the resolution in a case where it has been judged necessary to lower the resolution, and causes printing to be performed upon lowering the number of tones in a case where it has been judged necessary to lower the number of tones.

22. A printing apparatus in which both a resolution and a number of tones are capable of being changed over, said printing apparatus comprising:

receiving means for receiving print data and index information indicating a characteristic of the print data;

decision means for deciding one of a plurality of printing modes, based upon the index information received by said receiving means, wherein the plurality of printing modes include a first printing mode in which it is necessary to lower the resolution when the print data is printed by the printing apparatus and a second printing mode in which it is necessary to lower the number of tones of the print data; and control means for causing the print data to be printed at a resolution lower than an original resolution when said decision means decides the first printing mode as the printing mode, and causing the print data to be printed with a number of tones smaller than an original number of tones when said decision means decides the second printing mode as the printing mode.

23. The apparatus according to claim 22, wherein the characteristic includes a quantity of data and an image size, said control means compares the quantity of data and the image size obtained from the index information with prescribed values decided from a capacity of a memory possessed by the printing apparatus and a printing speed of the printing apparatus, and decides the first or second printing mode as the printing mode, if the quantity of data or the image size is greater than the relevant prescribed value.

24. The apparatus according to claim 22, wherein said receiving means receives index information that includes types of objects included in the print data, a number of objects of each type and a data size per each type.

25. The apparatus according to claim 22, wherein said control means converts the print data to print data having a resolution lower than the original resolution or a number of tones smaller than the original number of tones.

26. The apparatus according to claim 22, wherein the index information includes job index information regarding all print data to be printed, and page index information for each page, said decision means decides the printing mode based upon the job index information and the page index information, and said control means prints all print data upon lowering the resolution or the number of tones with regard to all of the print data if said decision means has decided, based upon the job index, the first or second printing mode as the printing mode, and prints print data from a particular page onward upon lowering the resolution or number of tones with regard to the particular page onward if said decision means has decided, based upon the page index information, the first or second printing mode as the printing mode.

27. The apparatus according to claim 22, wherein said decision means judges the necessity to lower the resolution and judges the necessity to lower the number of tones based upon different standards, and said control means causes printing to be performed upon lowering the resolution in a case where it has been judged necessary to lower the resolution, and causes printing to be performed upon lowering the number of tones in a case where it has been judged necessary to lower the number of tones.

28. An information processing method for generating print data for controlling a printing apparatus in which both a resolution and a number of tones are capable of being changed over, the method comprising:

an index creating step of creating index information indicating a characteristic of original print data;

a decision step of deciding, based upon the characteristic information obtained from the index information, one of a plurality of printing modes, wherein the plurality of printing modes include a first printing mode in which it is necessary to the lower resolution and a second printing mode in which it is necessary to lower the number of tones when the print data is printed by the printing apparatus; and a generation step of generating print data to be printed at the printing apparatus in accordance with the printing mode decided at the deciding step, so that the print data is printed at a resolution lower than an original resolution when the first printing mode is decided as the printing mode at the decision step and the print data is printed with a number of tones smaller than an original number of tones when the second printing mode is decided as the printing mode at the decision step.

29. The method according to claim 28, wherein the characteristic includes a quantity of data and an image size, said decision step compares the quantity of data and the image size obtained from the index information with prescribed values decided from a capacity of a memory possessed by the printing apparatus and a printing speed of the printing apparatus, and decides that it is necessary to lower the resolution or the number of tones, when the print data is printed by the printing apparatus, if the quantity of data or the image size is greater than the relevant prescribed value.

30. The method according to claim 28, wherein said index creating step creates index information that includes types of objects included in the original print data, a number of objects of each type and a data size per each type.

31. The method according to claim 28, wherein said generating step generates the print data including an instruction which causes the printing apparatus to print the print data at a resolution lower than the original resolution or with a number of tones smaller than the original number of tones.

32. The method according to claim 31, further comprising an acquisition step of acquiring a capacity of a memory possessed by the printing apparatus and a printing speed of the printing apparatus, or conditions decided from the capacity of the memory and the printing speed, and said decision step decides the printing mode based upon conditions acquired at said acquisition step.

33. The method according to claim 28, wherein said control step converts the original print data to print data having a resolution lower than the original resolution or a number of tones smaller than the original number of tones, and transmits the resulting print data to the printing apparatus.

34. The method according to claim 28, further comprising a step which, in dependence upon capacity of a memory possessed by the printing apparatus, is a step of determining changing-over between control performed by the host and control performed by the printing apparatus, said control causing the print data to be printed at a resolution lower than the original resolution or with a number of tones smaller than the original number of tones.

35. The method according to claim 28, wherein said generation step has a step which, if the first or second printing mode is decided as the printing mode at said decision step, is a step of displaying this fact and allowing an operator to enter whether processing is to be continued or not, the print data being printed at a resolution lower than the original resolution in the first printing mode or with a number of tones smaller than the original number of tones in the second printing mode if an entry to the effect that processing is to be continued has been entered.

36. The method according to claim 28, wherein the index information includes job index information regarding all print data to be printed, and page index information for each page, said decision step decides the printing mode based upon the job index information and the page index information, and said generation step generates all print data upon lowering the resolution or the number of tones with regard to all of the print data if it has been decided, based upon the job index, that it is necessary to lower the resolution or the number of tones, and generates print data from a particular page onward upon lowering the resolution or the number of tones with regard to the particular page onward if it has been decided, based upon the page index information, that it is necessary to lower the resolution or the number of tones.

37. The method according to claim 28, wherein said decision step judges the necessity to lower the resolution and judges the necessity to lower the number of tones based upon different standards, and said generation step generates the print data which causes printing to be performed upon lowering resolution in a case where it has been judged necessary to lower the resolution, and causes printing to be performed upon lowering the number of tones in a case where it has been judged necessary to lower the number of tones.

38. A storage medium storing a printer driver program for generating print data for controlling a printing apparatus in which both of a resolution and a number of tones are capable of being changed over, the program comprising steps of:

creating index information indicating a characteristic of original print data;

deciding one of a plurality of printing modes, based upon the characteristic information obtained from the index information, wherein the plurality of printing modes include a first printing mode in which it is necessary to lower the resolution when the print data is printed by the printing apparatus and a second printing mode in which it is necessary to lower a number of tones when the print data is printed by the printing apparatus; and generating print data to be printed at the printing apparatus in accordance with the decided printing mode, so that the print data is printed at a resolution lower than an original resolution when said decision step decides the first printing mode as the printing mode, and the print data is printed with a number of tones smaller than an original number of tones when said decision step decides the second printing mode as the printing mode.

39. A printing control method for controlling a printing apparatus in which both a resolution and a number of tones are capable of being changed over, the method comprising:

a receiving step of receiving print data and index information indicating a characteristic of the print data;

a decision step of deciding, based upon the index information received at said receiving step, one of a plurality of printing modes, wherein the plurality of printing modes include a first printing mode in which it is necessary to lower a resolution and a second printing mode in which it is necessary to lower a number of tones of the print data; and a control step of causing the print data to be printed at a resolution lower than an original resolution when the first printing mode is decided as the printing mode, and causing the print data to be printed with a number of tones smaller than an original number of tones when the second printing mode is decided as the printing mode at said decision step.

40. The method according to claim 39, wherein the characteristic of the print data includes a quantity of data and an image size, said decision step compares the quantity of data and the image size obtained from the index information with prescribed values decided from a capacity of a memory possessed by the printing apparatus and a printing speed of the printing apparatus, and decides the first or second printing mode as the printing mode when the quantity of data or the image size is greater than the relevant prescribed value.

41. The method according to claim 39, wherein said receiving step receives index information that includes types of objects included in the print data, a number of objects of each type and a data size per each type.

42. The method according to 39, wherein said control step converts the print data to print data having a resolution lower than the original resolution or a number of tones smaller than the original number of tones.

43. The method according to claim 39, wherein the index information includes job index information regarding all print data to be printed, and page index information for each page, said decision step decides the printing mode based upon the job index information and the page index information, and said control step prints all print data upon lowering the resolution or the number of tones with regard to all of the print data if, based upon the job index, it the first or second printing mode has been decided as the printing mode, and prints print data from a particular page onward upon lowering the resolution or number of tones with regard to the particular page onward if it has been decided, based upon the page index information, the first or second printing mode as the printing mode.

44. The method according to claim 39, wherein said decision step judges the necessity to lower the resolution and judges the necessity to lower the number of tones based upon different standards, and said control step causes printing to be performed upon lowering the resolution in a case where it has been judged necessary to lower the resolution, and causes printing to be performed upon lowering the number of tones in a case where it has been judged necessary to lower the number of tones.

45. A printer driver program for controlling a printing apparatus in which both a resolution and a number of tones are capable of being changed over, the program comprising steps of:

creating index information indicating a characteristic of original print data;

deciding one of a plurality of printing modes, based upon characteristic information obtained from the index information, wherein the plurality of printing modes include a first printing mode in which it is necessary to lower a resolution when the print data is printed by the printing apparatus and a second printing mode in which it is necessary to lower a number of tones when the print data is printed by the printing apparatus; and generating print data to be printed at the printing apparatus in accordance with the decided printing mode, so that the print data is printed at a resolution lower than an original resolution when said decision step decides the first printing mode as the printing mode and the print data is printed with a number of tones smaller than an original number of tones when said decision step decides the second printing mode as the printing mode.

46. The program according to claim 45, wherein the characteristic includes a quantity of data and an image size, said decision step compares the quantity of data and the image size obtained from the index information with prescribed values decided from a capacity of a memory possessed by the printing apparatus and a printing speed of the printing apparatus, and decides the first or second printing mode as the printing mode, if the quantity of data or the image size is greater than the relevant prescribed value.

47. The program according to claim 45, wherein said index creating step creates index information that includes types of objects included in the print data, a number of objects of each type and a data size per each type.

48. The program according to claim 45, wherein said generating step sends the printing apparatus an instruction which causes the printing apparatus to print the print data at a resolution lower than the original resolution or with a number of tones smaller than the original number of tones.

49. The program according to claim 48, further comprising an acquisition step for acquiring a capacity of a memory possessed by the printing apparatus and a printing speed of the printing apparatus, or conditions decided from the capacity of the memory and the printing speed, and said decision step decides the printing mode based upon conditions acquired by said acquisition step.

50. The program according to claim 45, wherein said generating step converts the original print data to print data having a resolution lower than the original resolution or a number of tones smaller than the original number of tones, and transmits the resulting print data to the printing apparatus.

51. The program according to claim 45, further comprising a step which, in dependence upon a capacity of a memory possessed by the printing apparatus, determines changing-over between control performed by the host and control performed by the printing apparatus, said control causing the print data to be printed at a resolution lower than the original resolution or with a number of tones smaller than the original number of tones.

52. The program according to claim 45, wherein said generating step includes a step which, if said decision step decides the first or second printing mode, is for displaying this fact and allowing an operator to enter whether processing is to be continued or not, the print data being printed at a resolution lower than the original resolution or with a number of tones smaller than the original number of tones if an entry to the effect that processing is to be continued has been entered.

53. The program according to claim 45, wherein the index information includes job index information regarding all print data to be printed, and page index information for each page, said decision step decides the printing mode based upon the job index information and the page index information, and said generating step generates all print data upon lowering the resolution or the number of tones with regard to all of the print data if said decision step has decided, based upon the job index, that it is necessary to lower the resolution or the number of tones, and generates print data from a particular page onward upon lowering the resolution or the number of tones with regard to the particular page onward if said decision step has decided, based upon the page index information, that it is necessary to lower the resolution or the number of tones.

54. The program according to claim 45, wherein said decision step judges the necessity to lower the resolution and judges the necessity to lower the number of tones based upon different standards, and said generating step generates the print data which causes printing to be performed upon lowering the resolution in a case where it has been judged necessary to lower the resolution, and causes printing to be performed upon lowering the number of tones in a case where it has been judged necessary to lower the number of tones.

55. A storage medium storing a program for controlling a printing apparatus in which both a resolution and a number of tones are capable of being changed over, the program comprising steps of:

receiving print data and index information indicating a characteristic of the print data;

deciding one of a plurality of printing modes, based upon the index information received by said receiving step, wherein the plurality of printing modes include a first printing mode in which it is necessary to lower the resolution and a second printing mode in which it is necessary to lower the number of tones of the print data; and a control step for causing the print data to be printed at a resolution lower than an original resolution when the decision step decides the first printing mode as the printing mode, and causing the print data to be printed with a number of tones smaller than an original number of tones when said decision step decides the second printing mode as the printing mode.

56. The storage medium according to claim 55, wherein the characteristic includes a quantity of data and an image size, said decision step compares the quantity of data and the image size obtained from the index information with prescribed values decided from a capacity of a memory possessed by the printing apparatus and a printing speed of the printing apparatus, and decides the first or second printing mode as the printing mode if the quantity of data or the image size is greater than the relevant prescribed value.

57. The storage medium according to claim 55, wherein said receiving step receives index information that includes types of objects included in the print data, a number of objects of each type and a data size per each type.

58. The storage medium according to claim 55, wherein said control step converts the print data to print data having a resolution lower than the original resolution or a number of tones smaller than the original number of tones.

59. The storage medium according to claim 55, wherein the index information includes job index information regarding all print data to be printed, and page index information for each page, said decision step decides the printing mode based upon the job index information and the page index information, and said control step prints all print data upon lowering the resolution or the number of tones with regard to all of the print data if said decision step has decided, based upon the job index, the first or second printing mode as the printing mode, and prints print data from a particular page onward upon lowering the resolution or the number of tones with regard to the particular page onward if said decision step has decided, based upon the page index information, the first or second printing mode as the printing mode.

60. The storage medium according to claim 55, wherein said decision step judges the necessity to lower the resolution and judges the necessity to lower the number of tones based upon different standards, and said control step causes printing to be performed upon lowering the resolution in a case where it has been judged necessary to lower the resolution, and causes printing to be performed upon lowering the number of tones in a case where it has been judged necessary to lower the number of tones.

61. The apparatus according to claim 12, wherein the plurality of printing modes further include a third mode in which it is necessary to lower both resolution and a number of tones, said generation means generates the print data to be printed at the printing apparatus so that the print data is printed at a resolution lower than the original resolution and with a number of tones smaller than the original number of tones when said decision means decides the third mode as the printing mode.

62. The apparatus according to claim 61, wherein said generation means generates the print data including an instruction which causes the printing apparatus to print the print data at a resolution lower than the original resolution and with a number of tones smaller than the original number of tones.

63. The apparatus according to claim 61, wherein said generation means converts the original print data to print data having a resolution lower than the original resolution and a number of tones smaller than the original number of tones, and transmits the resulting print data to the printing apparatus.

64. An information processing apparatus as a host computer for generating print data and outputting the print data to a printing apparatus in which a printing grade can be changed via a printer interface, said apparatus comprising:

analyzing means for analyzing data to be printed and obtaining characteristics of the data;

decision means for deciding, based upon the characteristics obtained by said analyzing means and a control condition, whether or not it is necessary to lower the printing grade when the print data is printed by the printing apparatus; and generation means for generating the print data to be printed at a printing grade lower than an original printing grade on the basis of said data if said decision means decides that it is necessary to lower the printing grade.

65. The apparatus according to claim 64, wherein the data to be printed is temporarily spooled data for generating the print data.

66. The apparatus according to claim 64, wherein the print data is described in a page description language.

67. The apparatus according to claim 64, wherein said generation means append at command which designates the printing grade in the print data.

68. The apparatus according to claim 64, wherein the control condition is given in accordance with the printing apparatus.

69. The apparatus according to claim 64, wherein resolution and a number of tones of the printing apparatus are capable of being changed over, and the printing grade is changed over by changing at least one of the resolution and the number of tones.

70. The apparatus according to claim 64, wherein said decision means further decides whether the resolution or the number of tones should be changed when it is decided that it is necessary to lower the printing grade.

71. The apparatus according to claim 64, wherein said decision means further decides whether both the resolution and the number of tones should be changed or not when it is decided that it is necessary to lower the printing grade.

72. The apparatus according to claim 64, wherein said information processing apparatus is realized by executing a printer driver program.

73. An information processing method for generating print data and outputting the print data to a printing apparatus in which a printing grade can be changed via a printer interface, said method comprising the steps of:

analyzing data to be printed and obtaining characteristics of the data;

deciding, based upon the characteristics obtained in said analyzing step and a control condition, whether or not it is necessary to lower the printing grade when the print data is printed by the printing apparatus; and generating the print data to be printed at a printing grade lower than an original printing grade on the basis of said data if said decision means decides that it is necessary to lower the printing grade.

74. The method according to claim 73, wherein the data to be printed is temporarily spooled data for generating the print data.

75. The method according to claim 73, wherein the print data is described in a page description language.

76. The method according to claim 73, wherein a command which designates the printing grade is appended in the print data at said generating step.

77. The method according to claim 73, wherein the control condition is given in accordance with the printing apparatus.

78. The method according to claim 73, wherein resolution and a number of tones of the printing apparatus are capable of being changed over, and the printing grade is changed over by changing at least one of the resolution and the number of tones.

79. The method according to claim 73, wherein it is decided whether the resolution or the number of tones should be changed when it is decided that it is necessary to lower the printing grade.

80. The method according to claim 73, wherein it is decided whether both the resolution and the number of tones should be changed or not when it is decided that it is necessary to lower the printing grade.

81. A computer executable program as a printer driver for realizing an information processing apparatus for generating print data and outputting the print data to a printing apparatus in which a printing grade can be changed via a printer interface, said program comprising the steps of:

analyzing data to be printed and obtaining characteristics of the data;

deciding, based upon the characteristics obtained in said analyzing step and a control condition, whether or not it is necessary to lower the printing grade when the print data is printed by the printing apparatus; and generating the print data to be printed at a printing grade lower than an original printing grade on the basis of said data if said decision means decides that it is necessary to lower the printing grade.

82. A storage medium for storing a computer executable program as a printer driver for realizing an information processing apparatus for generating print data and outputting the print data to a printing apparatus in which a printing grade can be changed via a printer interface, said program comprising the steps of:

analyzing data to be printed and obtaining characteristics of the data;

deciding, based upon the characteristics obtained in said analyzing step and a control condition, whether or not it is necessary to lower the printing grade when the print data is printed by the printing apparatus; and generating the print data to be printed at a printing grade lower than an original printing grade on the basis of said data if said decision means decides that it is necessary to lower the printing grade.

83. A printing system having a host and a printing apparatus in which both resolution and number of tones are capable of being changed over, the system comprising:

an index creating unit which creates index information indicating a characteristic of print data;

a decision unit which decides one of a plurality of printing modes, based upon the characteristic obtained from the index information, wherein the plurality of printing modes include a first mode in which it is necessary to lower resolution when the print data is printed by the printing apparatus and a second mode in which it is necessary to lower a number of tones when the print data is printed by the printing apparatus; and a controller which causes the print data to be printed at a resolution lower than an original resolution when said decision unit decides the first printing mode as the printing mode, and causes the print data to be printed with a number of tones smaller than an original number of tones when said decision unit decides the second printing mode as the printing mode.

84. An information processing apparatus for generating print data for controlling a printing apparatus in which both resolution and number of tones are capable of being changed over, said apparatus comprising:

an index creating unit which creates index information indicating a characteristic of original print data;

a decision unit which decides one of a plurality of printing modes, based upon the characteristic information obtained from the index information, wherein plurality of printing modes include a first printing mode in which it is necessary to lower resolution when the print data is printed by the printing apparatus and a second printing mode in which it is necessary to lower a number of tones when the print data is printed by the printing apparatus; and a generation unit which generates print data to be printed at the printing apparatus in accordance with the decided printing mode, so that the print data is printed at a resolution lower than an original resolution when said decision unit decides the first printing mode as the printing mode, and the print data is printed with a number of tones smaller than an original number of tones when said decision means decides the second printing modes as the printing mode.

85. A printing apparatus in which both resolution and number of tones is capable of being changed over, said printing apparatus comprising:

a reception unit which receives print data and index indicating a characteristic of the print data;

a decision unit which decides one of a plurality of printing modes, based upon the index information received by said receiving means, wherein the plurality of printing modes include a first mode in which it is necessary to lower a resolution when the print data is printed by the printing apparatus and a second printing mode in which it is necessary to lower a number of tones of the print data; and a controller which causes the print data to be printed at a resolution lower than an original resolution when said decision unit decides the first printing mode as the printing mode, and causes the print data to be printed with a number of tones smaller than an original number of tones when said decision unit decides the second printing mode as the printing mode.

86. A host computer apparatus for generating print data and outputting the print data to a printing apparatus in which a printing grade can be changed via a printer interface, said apparatus comprising:

an analyzing unit which analyzes data to be printed and obtaining characteristics of the data;

a decision means which decides, based upon the characteristics obtained by said analyzing unit and a control condition, whether or not it is necessary to lower the printing grade when the print data is printed by the printing apparatus; and a generation unit which generates the print data to be printed at a printing grade lower than an original printing grade on the basis of said data if said decision unit decides that it is necessary to lower the printing grade.

* * * * *

UNITED STATES PATENT AND TRADEMARK OFFICE

CERTIFICATE OF CORRECTION

PATENT NO. : 6,172,765 B1
DATED : January 9, 2001
INVENTOR(S) : Kawamoto

It is certified that error appears in the above-identified patent and that said Letters Patent is hereby corrected as shown below:

Column 1,
Line 42, "determined" should read -- determination --.

Column 13,
Lime 8, "pages" should read -- page --.

Column 22,
Line 12, "the lower" should read -- lower the --.

Column 24,
Line 32, "it" should be deleted.

Signed and Sealed this

Sixth Day of November, 2001

*Attest:*

NICHOLAS P. GODICI

*Attesting Officer*

*Acting Director of the United States Patent and Trademark Office*